United States Patent
Zhyhinas et al.

(10) Patent No.: US 10,374,424 B2
(45) Date of Patent: Aug. 6, 2019

(54) WIDE RANGE POWER DISTRIBUTION SYSTEMS AND METHODS

(71) Applicant: Argentum Electronics, Inc., Toronto (CA)

(72) Inventors: Oleh Zhyhinas, Toronto (CA); Bolis Ibrahim, Toronto (CA); Kamil Aleksander Wyszynski, Toronto (CA)

(73) Assignee: Argentum Electronics, Inc., Toronto, Ontario (CA)

( * ) Notice: Subject to any disclaimer, the term of this patent is extended or adjusted under 35 U.S.C. 154(b) by 45 days.

(21) Appl. No.: 15/436,231

(22) Filed: Feb. 17, 2017

(65) Prior Publication Data

US 2017/0163035 A1    Jun. 8, 2017

Related U.S. Application Data

(63) Continuation-in-part of application No. 15/388,824, filed on Dec. 22, 2016, which is a continuation-in-part of application No. 15/321,420, filed as application No. PCT/IB2016/054938 on Aug. 18, 2016.

(60) Provisional application No. 62/206,270, filed on Aug. 18, 2015.

(51) Int. Cl.
| | | |
|---|---|---|
| H02J 1/10 | (2006.01) | |
| H02J 1/12 | (2006.01) | |
| G05F 1/66 | (2006.01) | |
| H02J 4/00 | (2006.01) | |
| H02J 7/00 | (2006.01) | |

(52) U.S. Cl.
CPC .................. H02J 1/12 (2013.01); G05F 1/66 (2013.01); H02J 1/10 (2013.01); H02J 4/00 (2013.01); H02J 7/0014 (2013.01)

(58) Field of Classification Search
CPC ........................................................ H02J 1/10
USPC ................ 307/11, 18, 19, 24, 29, 66, 85–87
See application file for complete search history.

(56) References Cited

U.S. PATENT DOCUMENTS

| | | | | |
|---|---|---|---|---|
| 4,287,465 A | * | 9/1981 | Godard | ..................... H02J 1/14 320/101 |
| 4,314,327 A | | 2/1982 | Depuy | |
| 4,323,788 A | | 4/1982 | Smith | |

(Continued)

FOREIGN PATENT DOCUMENTS

| | | |
|---|---|---|
| EP | 2538515 A1 | 12/2012 |
| WO | 2014059236 A1 | 4/2014 |

OTHER PUBLICATIONS

International Search Report dated Oct. 31, 2016, for PCT application No. PCT/IB2016/054938.

(Continued)

*Primary Examiner* — Adi Amrany
(74) *Attorney, Agent, or Firm* — Paul R. Horbal; Bereskin & Parr LLP/S.E.N.C.R.L., s.r.l.

(57) ABSTRACT

Power distribution systems and methods for distributing power from at least one power source to a plurality of outputs that can differ in output power level. A controller monitors energy storage elements and controls a switch network to dynamically charge and discharge the energy storage elements while matching one or more desired output levels. The controller can dynamically direct the switch network to alter inputs and outputs, thereby changing the frequency and order in which energy storage elements are connected.

22 Claims, 22 Drawing Sheets

(56) References Cited

U.S. PATENT DOCUMENTS

| | | | |
|---|---|---|---|
| 4,766,364 A | 8/1988 | Biamonte et al. | |
| 5,001,623 A | 3/1991 | Magid | |
| 5,610,807 A * | 3/1997 | Kanda | H02M 3/158 |
| | | | 307/125 |
| 5,886,508 A | 4/1999 | Jutras | |
| 5,959,368 A | 9/1999 | Kubo et al. | |
| 6,177,783 B1 | 1/2001 | Donohue | |
| 6,355,990 B1 * | 3/2002 | Mitchell | H02J 1/06 |
| | | | 307/125 |
| 6,420,839 B1 | 7/2002 | Chiang et al. | |
| 6,522,190 B1 | 2/2003 | Malik et al. | |
| 6,768,225 B2 | 7/2004 | Chang et al. | |
| 6,873,134 B2 | 3/2005 | Canter et al. | |
| 7,009,313 B1 | 3/2006 | Parramon et al. | |
| 7,126,312 B2 | 10/2006 | Moore | |
| 7,227,277 B2 | 6/2007 | Chapman | |
| 7,256,568 B2 | 8/2007 | Lam et al. | |
| 7,456,523 B2 | 11/2008 | Kobayashi | |
| 7,538,527 B2 | 5/2009 | O'Driscoll et al. | |
| 7,598,706 B2 | 10/2009 | Koski et al. | |
| 7,796,412 B2 * | 9/2010 | Fornage | H02M 3/285 |
| | | | 323/906 |
| 7,863,772 B2 | 1/2011 | Dwelley et al. | |
| 8,189,351 B2 | 5/2012 | Chung et al. | |
| 8,193,761 B1 | 6/2012 | Singh | |
| 8,274,172 B2 * | 9/2012 | Hadar | H01L 31/02021 |
| | | | 307/5 |
| 8,310,094 B2 * | 11/2012 | Yamada | H02J 7/35 |
| | | | 307/46 |
| 8,860,246 B2 * | 10/2014 | Hadar | H02J 3/385 |
| | | | 307/19 |
| 9,184,594 B2 | 11/2015 | Garabandic | |
| 9,716,406 B2 * | 7/2017 | Beck | H02J 3/32 |
| 2007/0179720 A1 * | 8/2007 | Becker | H02J 3/383 |
| | | | 702/58 |
| 2008/0072080 A1 | 3/2008 | Chapuis et al. | |
| 2008/0122518 A1 | 5/2008 | Besser et al. | |
| 2008/0174275 A1 * | 7/2008 | Nakao | H02J 7/0013 |
| | | | 320/128 |
| 2009/0295330 A1 * | 12/2009 | Li | H02J 7/0013 |
| | | | 320/124 |
| 2009/0302681 A1 | 12/2009 | Yamada et al. | |
| 2010/0102882 A1 * | 4/2010 | Yoshino | B41J 2/04541 |
| | | | 330/251 |
| 2011/0019444 A1 * | 1/2011 | Dargatz | H02H 1/0015 |
| | | | 363/50 |
| 2011/0273130 A1 * | 11/2011 | Lee | H01M 10/465 |
| | | | 320/101 |
| 2012/0153729 A1 | 6/2012 | Song et al. | |
| 2012/0175963 A1 | 7/2012 | Adest et al. | |
| 2013/0181527 A1 * | 7/2013 | Bhowmik | H02M 7/44 |
| | | | 307/63 |
| 2013/0241294 A1 | 9/2013 | Cleland | |
| 2013/0271062 A1 * | 10/2013 | Lu | H02J 7/35 |
| | | | 320/101 |
| 2014/0167505 A1 * | 6/2014 | Beck | H02J 3/32 |
| | | | 307/23 |
| 2014/0183953 A1 | 7/2014 | Harrison | |
| 2015/0048681 A1 | 2/2015 | Kwasinski et al. | |

OTHER PUBLICATIONS

Matsuo et al.: "Characteristics of the Multiple-Input DC-DC Converter", IEEE Transactions on Industrial Electronics, vol. 51, No. 3, Jun. 2004.

Afridi et al: "Enhanced Bipolar Stacked Switched Capacitor Energy Buffers", 2012 IEEE Energy Conversion Congress and Exposition, pp. 4209-4216, Sep. 2012.

Chen et al: "Stacked Switched Capacitor Energy Buffer Architecture", Department of Electrical Engineering and Computer Science, 2012 IEEE Applied Power Electronics Conference, pp. 1404-1413, Feb. 2012.

Karteek Gummi: "Derivation of New Double-Input DC-DC Converters Using the Double Block Methodology", Thesis—Master of Science in Electrical Engineering, 2008, Missouri University of Science and Technology, retrieved from http://power.mst.edu/media/academic/power/documents/theses/Thesis_Karteek_Gummi.pdf.

Kosare et al: "Design and Simulation of Multiple-Input Single-Output DC-DC Converter", Students' publication at EE Branch; available at http://www.academia.edu/5430740/Design_and_Simulation_of_Multiple-Input_Single-Output_DC-DC_Converter.

International Search Report dated Apr. 28, 2017; in connection to PCT/CA2017/050211.

International Search Report dated Aug. 18, 2017, in connection to PCT/CA2016/051442.

Office Action dated Aug. 30, 2018, received in connection to co-pending U.S. Appl. No. 15/388,824.

* cited by examiner

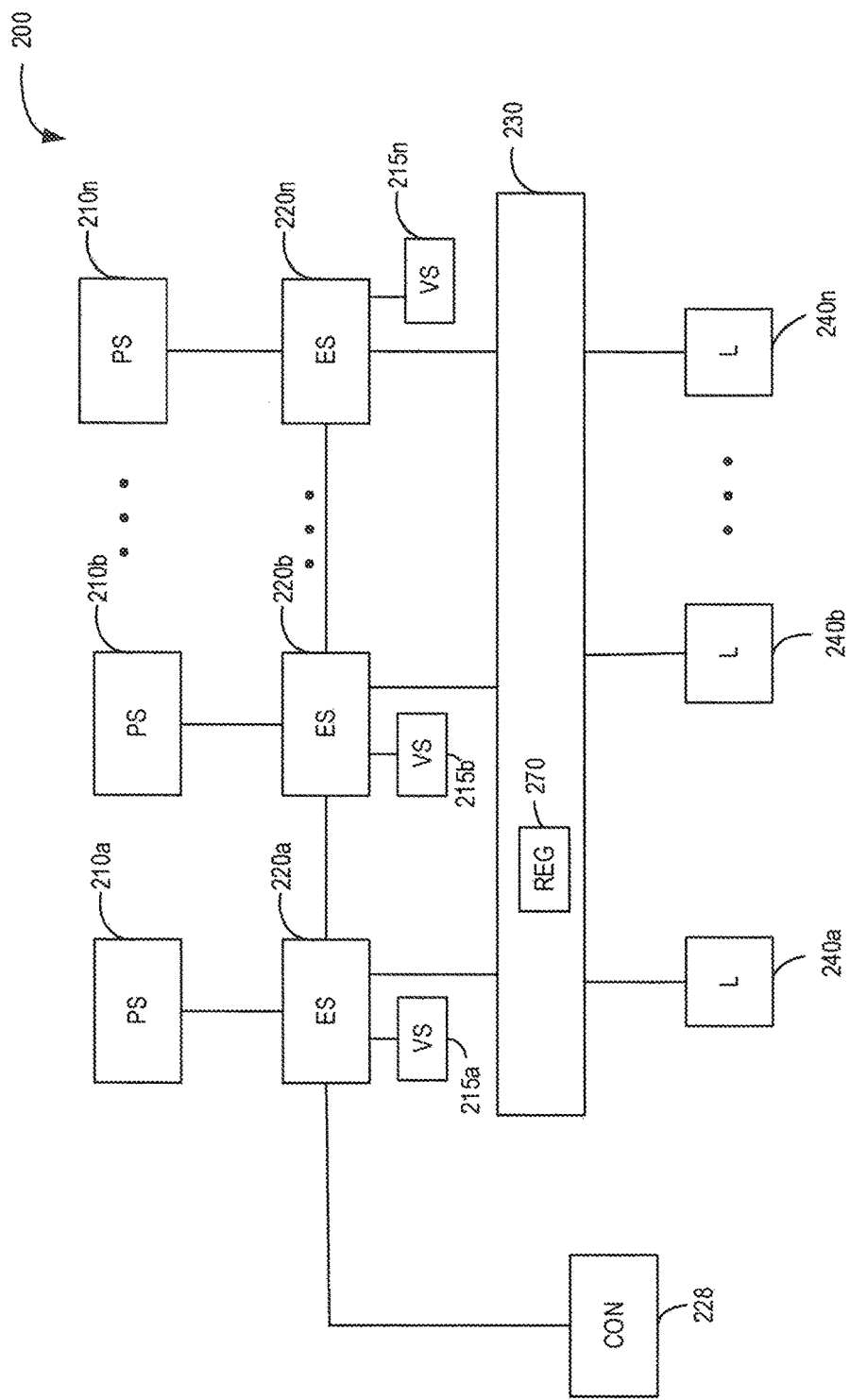

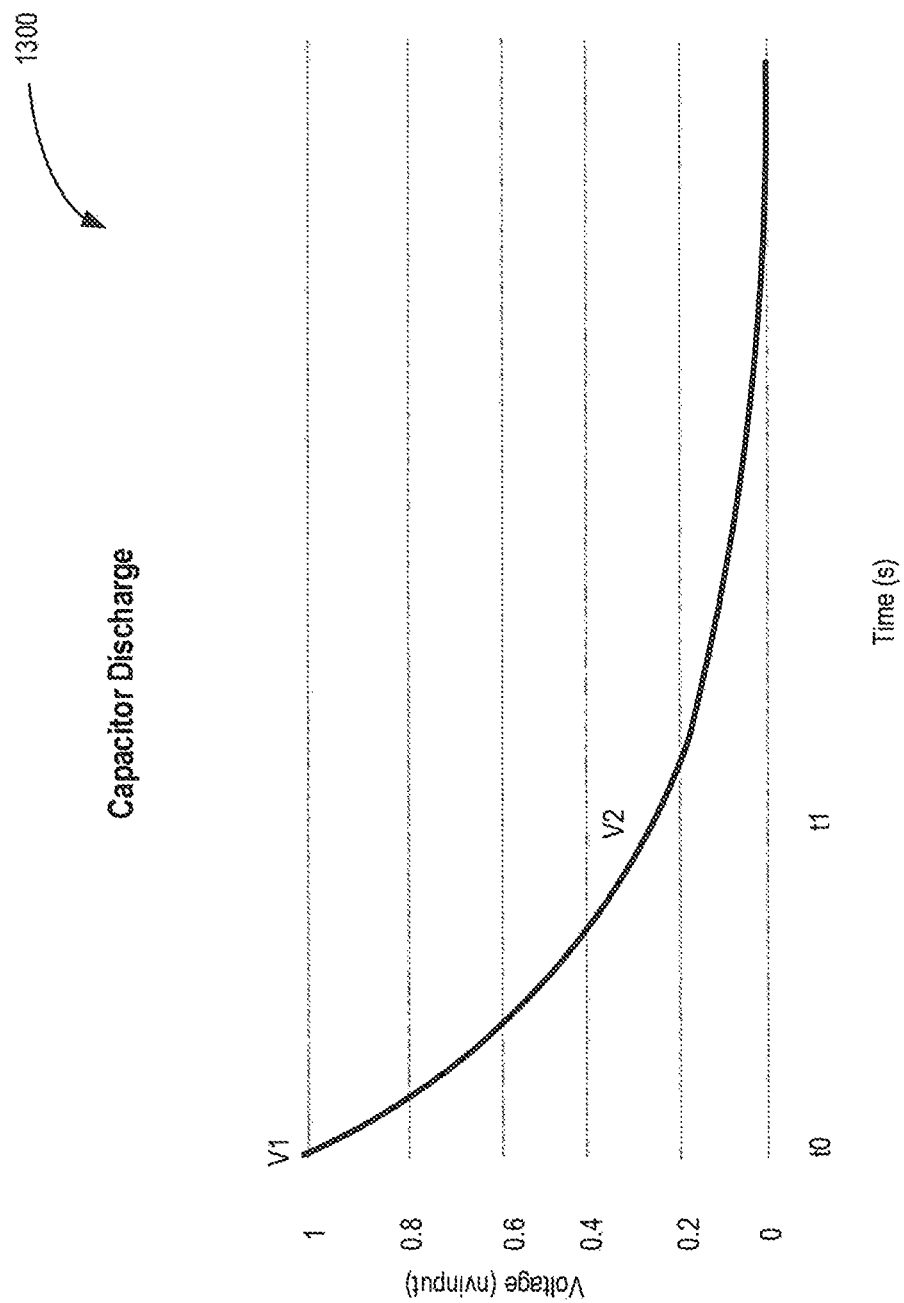

WIDE RANGE POWER DISTRIBUTION SYSTEMS AND METHODS

CROSS-REFERENCE TO RELATED APPLICATIONS

This application is a continuation-in-part of co-pending U.S. patent application Ser. No. 15/388,824, filed Dec. 22, 2016, which is a continuation-in-part of U.S. patent application Ser. No. 15/321,420, which is a national phase entry of PCT International Patent Application No. PCT/IB2016/054938, filed Aug. 18, 2016, which claims the benefit of U.S. Provisional Patent Application No. 62/206,270, filed Aug. 18, 2015.

FIELD

The described embodiments relate to managing power distribution between one or more power sources and one or more loads in an electrical network, and more particularly to the management of a direct current (DC) electrical network.

INTRODUCTION

Conventionally, distribution from a single input to multiple different power outputs in a single electrical network has presented a challenge, particularly where the power outputs have different voltage or current requirements.

The maximum power point can be characterized as the operating point for a power source or load that provides the highest power transfer efficiency. That is, for any given set of operational conditions, the maximum power point will correspond to voltage and current values that provide a maximum power output. The maximum power point can vary over time, as operating conditions and loads change.

Generally, power sources will have a particular output voltage or small voltage range that corresponds to the maximum power point. Likewise, power loads will have a particular input voltage or small voltage range that corresponds to the maximum power point. When the voltage is lowered or raised, for example due to time-varying behavior or external factors affecting power generation, the transferred power may be reduced. This relationship is illustrated in FIG. 9.

For example, an array of identical photovoltaic cells may exhibit varying power output levels due to uneven cloud cover affecting cell voltage. This can cause the power outputs of the photovoltaic cells to be mismatched.

When multiple power sources are combined in series, they may not have the same current at the maximum power point, and since the current must be equal across all sources, one or more of the power sources will not operate at their respective maximum power points.

Alternatively, if power sources are combined in parallel, they may not have the same voltage at the maximum power point. Since the voltage across all power sources must be the same in a parallel configuration, some or all of the power sources may not operate at their respective maximum power points.

Previous topologies have been developed to connect multiple power sources to a load. PCT Publication No. WO2014/059236 A1 describes one topology that involves the individual control and regulation of each power source. As illustrated in FIG. 1, each power source 110a to 110n has a maximum power point tracking (MPPT) module 111a to 111n connected to it, with the outputs of the MPPT modules connected together to an electrical network 130, which in turn has loads 140a to 140n. The output voltage of the each MPPT module 111a to 111n is regulated to a common voltage of the electrical network 130, which is in turn supplied to the loads 140a to 140n. The requirement for a plurality of MPPT modules corresponding to each power source increases the complexity and cost of this approach, and has therefore limited its usefulness.

H. Matsuo et al., "Characteristics of the Multiple-Input DC-DC Converter," IEEE Trans. Ind. Electron., vol. IE-51, pp. 625-631, June 2004, describe another method to combine power sources, which is to connect them together through a transformer, with each power source having windings around a common core. This method results in what is essentially a buck-boost type DC-DC converter system, albeit with the inductor substituted by a transformer having multiple input windings. Such a system can be expensive to implement and does not scale well, as it requires an increasingly larger transformer for each additional power source.

In contrast to the above-noted issues with combining power from multiple sources, when there is a plurality of loads, each load can have a range of voltages and currents that correspond to its optimal operating point, or OOP, which can vary depending on application needs. For example, in some cases, the optimal operating point may be one where power is transferred most efficiently. In some other cases, a load such as a DC motor may have different optimal operating points, depending on what the needs of a particular application (e.g., least vibration, most torque, greatest power transfer to a drivetrain, etc.). In another example, the OOP for an LED may be one that provides the best tradeoff between heat and light output, or that provides longest life.

For example, an array of identical battery cells may exhibit varying charging due to differing battery chemistry or a different number of charge cycles experienced by each cell. This can cause the charge times and charge levels to be suboptimal when all batteries are charged from a single source.

SUMMARY

In one broad aspect, there is provided a system for distributing electrical power to a plurality of loads, the system comprising: a plurality of energy storage elements arranged in a plurality of sets, each of the plurality of sets having a common power source; a plurality of voltage sensors coupled respectively to each of the plurality of energy storage elements; a plurality of network-side switches corresponding respectively to each of the plurality of energy storage elements, each network-side switch coupled between a respective energy storage element and the power source; a plurality of load-side switches corresponding respectively to each of the plurality of energy storage elements, each load-side switch coupled between a respective energy storage element and one of the plurality of loads; a controller communicatively coupled to the plurality of voltage sensors and the plurality of network-side switches and the plurality of load-side switches, and configured to: determine a respective state for each selected element of the plurality of energy storage elements; based on the respective state of each of the plurality of energy storage elements, determining a selected energy storage element from the plurality of energy storage elements to be charged; and direct the plurality of network-side switches and the plurality of load-side switches to couple the selected energy storage element to the power source.

The controller may be further configured to couple the plurality of energy storage elements, other than the selected energy storage element, to the plurality of loads respectively.

The controller may be further configured to decouple the selected energy storage element from its respective load.

The controller may be further configured to direct at least one of the load-side switches to decouple a previous selected energy storage element from the output, and to direct at least one of the network-side switches to recouple the previous selected energy storage element to its respective power source.

The controller may be further configured to periodically repeat the determining, the decoupling the selected energy storage element, the decoupling the previous selected energy storage element, the recoupling and the coupling to selectively switch between the plurality of energy storage elements.

The controller may be further configured to: receive from the plurality of voltage sensors a plurality of node voltages corresponding respectively to the plurality of energy storage elements, and determine that a selected node voltage corresponding to the selected energy storage element is farthest from the optimal operating point of its respective load.

The controller may be further configured to determine a plurality of energy levels corresponding respectively to the plurality of energy storage elements, wherein the selecting is based on the plurality of energy levels.

The controller may be further configured to enforce a minimum or maximum output power when selecting the selected energy storage element.

The controller may be further configured to enforce a minimum or maximum output voltage when selecting the selected energy storage element.

In some cases, a period of the periodic repeating is determined based on a discharge time of the plurality of storage elements.

In some cases, a period of the periodic repeating is determined based on a charge time of the plurality of storage elements.

In another broad aspect, there is provided a method of distributing electrical power to a plurality of loads, the method comprising: providing a plurality of energy storage elements arranged in a plurality of sets, each of the plurality of sets having a common power source; determining a respective state for each selected element of the plurality of energy storage elements; based on the respective state of each of the plurality of energy storage elements, determining output selected energy storage element from the plurality of energy storage elements to be charged; and coupling the selected energy storage element to the power source.

In some cases, the method may further comprise coupling the plurality of energy storage elements, other than the selected energy storage element, to the plurality of loads respectively.

In some cases, the at least one output comprises at least one of the plurality of loads.

In some cases, coupling the selected energy storage element to the respective load further comprises decoupling the selected energy storage element from its respective power source.

In some cases, coupling the selected energy storage element to the respective load comprises decoupling a previous selected energy storage element from its respective load and recoupling the previous selected energy storage element to its respective power source.

In some cases, the method may further comprise periodically repeating the determining, the decoupling the selected energy storage element, the decoupling the previous selected energy storage element, the recoupling and the coupling to selectively switch between the plurality of energy storage elements.

In some cases, the determining comprises measuring a plurality of node voltages corresponding respectively to the plurality of energy storage elements, and determining that a selected node voltage corresponding to the selected energy storage element is farthest from the optimal operating point of its respective load.

In some cases, the determining further comprises determining a plurality of energy levels corresponding respectively to the plurality of energy storage elements, wherein the determining is based on the plurality of energy levels.

In some cases, the determining further comprises enforcing a minimum or maximum output power.

In some cases, the determining further comprises enforcing a minimum or maximum output voltage.

In some cases, a period of the periodic repeating is determined based on a discharge time of the plurality of storage elements.

In some cases, a period of the periodic repeating is determined based on a charge time of the plurality of storage elements.

In another broad aspect, there is provided a non-transitory computer-readable medium storing computer usable instructions for execution by a processor, the instructions when executed by the processor for causing the processor to carry out the methods as described herein.

DRAWINGS

A preferred embodiment of the present invention will now be described in detail with reference to the drawings, in which:

FIG. 2 is an example system for combining electrical power from a plurality of power sources;

FIG. 13 is an example plot of voltage vs. time for a capacitor discharge;

DESCRIPTION OF VARIOUS EMBODIMENTS

Figure 1:
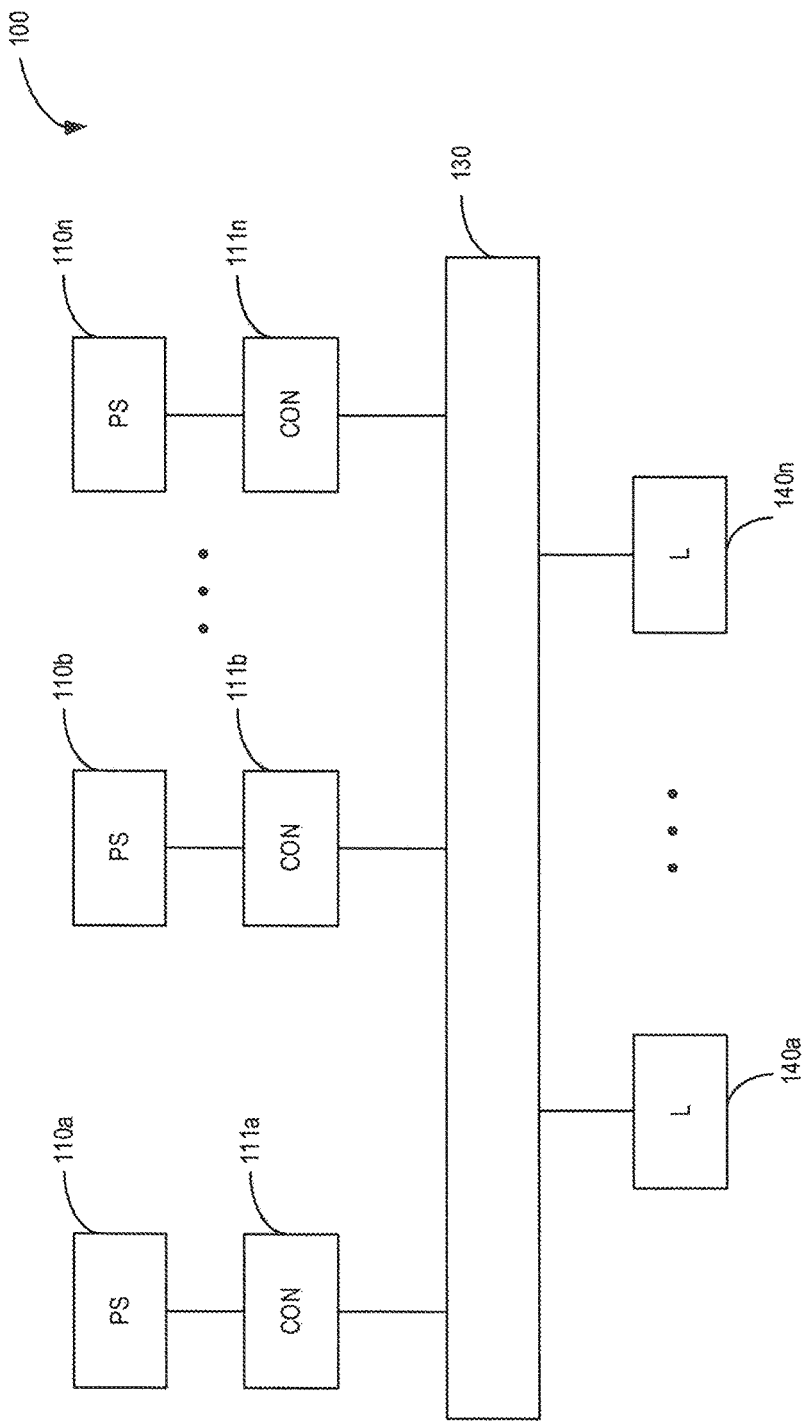
FIG. 1 is a prior art power combiner system.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language. Accordingly, the program code may be written in C, C++ or any other suitable programming language and may comprise modules or classes, as is known to those skilled in the art. Alternatively, or in addition thereto, some of these elements implemented via software may be written or provided in assembly language, machine language or byte code as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for execution by one or more processors. The medium may be provided in various forms, including non-transitory forms such as, but not limited to, one or more diskettes, compact disks, tapes, chips, and magnetic and electronic storage.

Embodiments of the systems and methods described herein facilitate the combination of power from one or more sources that may differ in output voltages and currents, and distribution to one or more outputs or loads. In some cases, the power transfer can be bi-directional, for example controlling the charging and discharging of battery cells. The described embodiments can be used to minimize power loss where voltages or currents of different values are to be distributed in any circuit topology. Embodiments generally employ switches and energy storage elements in an electrical path, or paths, to selectively and selectably isolate both power sources and loads in a time-varying fashion, and to connect the energy storage elements to the inputs or outputs (as needed), for the purpose of delivering smooth power at the desired voltages to each load. In particular, power can be stored in the energy storage elements, until the switches create an electrical path, or paths, to the desired output, or outputs.

Power inputs, energy storage elements and the power output, or outputs, are connected through switches. Some energy storage elements store power from the power inputs while some energy storage elements release power to the power output, or outputs. Energy storage elements alternate between storing energy from the power input, or inputs, and releasing energy to the power output, or outputs. The switches may alternate the electrical path, or paths, from energy storage from the power input, or inputs, to energy release to the power output, or outputs. This arrangement of energy storage elements and switches can be scaled to the number of power inputs. In some embodiments a controller can transmit signals to the switches and monitor the energy storage elements. Switches can be any electrical switch including, but not limited to, transistors and relays. Energy storage elements can be any electrical energy storage element including, but not limited to, capacitors and inductors.

Some types of power inputs may also operate as power outputs in certain contexts, and vice versa. For example, a chemical battery may operate as a load while it is being charged but, once charged, it may be switched to operate as a power source. In another example, some types of electric generators (e.g., power sources) may be operated as motors (e.g., loads) if switched by the system.

The described embodiments generally provide for combining the input from one or more power sources, each of which may have differing maximum power points, and distributing to one or more power outputs with different optimized operating points, all while attempting to enhance and maximize efficiency. Power sources of varying types may be used; examples of suitable power sources include, but are not limited to, photovoltaic, wind turbine, geothermal, chemical battery, tidal, hydroelectric, etc. Conventional power sources, such as steam-powered turbines, may also be used. The described embodiments generally monitor power produced by each power source and regulate power provided to one or more outputs by operating switches provided between the power sources, a plurality of energy storage elements and the outputs. Generally, the described embodiments attempt to obtain the maximum power from each of the power sources, and to deliver maximum power to each power output, under any given operating conditions.

Referring now to FIG. 2, there is illustrated an example system for combining electrical power from a plurality of power sources. Power combiner system 200 has a plurality of power sources 210a to 210n, the output of which is electrically couplable to the inputs of respective of energy storage elements 220a to 220n. The output of energy storage elements 220a to 220n is electrically couplable to electrical network 230, which is in turn coupled to electrical loads 240a to 240n. In some embodiments, there may be only one load (e.g., load 240a).

Each of energy storage elements 220a to 220n is couplable to power sources 210a to 210n under the control of controller 228. For example, controller 228 may transmit signals to input or output switches (not shown), to cause an energy storage element to be coupled to a power source, or to the electrical network 230. In some embodiments, one or more energy storage elements 220a to 220n may be provided with a dedicated controller, which may control the switches of the energy storage element or otherwise enable or disable input to or output from the energy storage element.

In some embodiments, one or more of power sources 210a to 210n may also be selectively and selectably operated as loads. For example, if power source 210b is a chemical battery, such as a lithium ion battery, it may be switched by controller 228 between operating as a power source (e.g., while discharging to charge energy storage element 220b) and operating as a load (e.g., while charging from energy storage element 220b).

Controller 228 is communicatively coupled to energy storage elements 220a to 220n, or their respective input and output switches, to operate the switches and controllably couple and decouple each energy storage element to and from its respective power source, and also to and from the electrical network 230 and ultimately to electrical loads 240a to 240n. Controller 228 is also coupled to voltage sensors 215a to 215n provided at each energy storage element, or its respective switches, to monitor node voltages. In some embodiments, voltage sensors may be replaced with power sensors, current sensors or other sensors.

Controller 228 generally is a computing device with a processor, memory and input/output hardware, such as a serial or parallel communications interface. In some cases, controller 228 may be equipped with a network communications interface for monitoring and control of energy storage elements or their switches. The memory of controller 228 may be volatile or non-volatile, or a combination of both. The memory stores computer-readable and executable program code, which directs the controller 228 to execute one or more control programs as described herein. Generally, controller 228 monitors input from energy storage elements 220a to 220n and uses the input to dynamically determine a respective state of each of the one or more energy storage characteristic of each energy storage element. Examples of states include voltage levels, current levels, power levels and other data about the state of the energy storage element or its respective electrical nodes or network. Based on the respective state of each of the energy storage elements, the controller 228 dynamically determines an output configuration that provides an optimal or maximum power output from each power source or to each load, and accordingly dynamically causes at least one output element to be coupled to electrical network 230 or a power source (e.g., an output).

Figure 5:
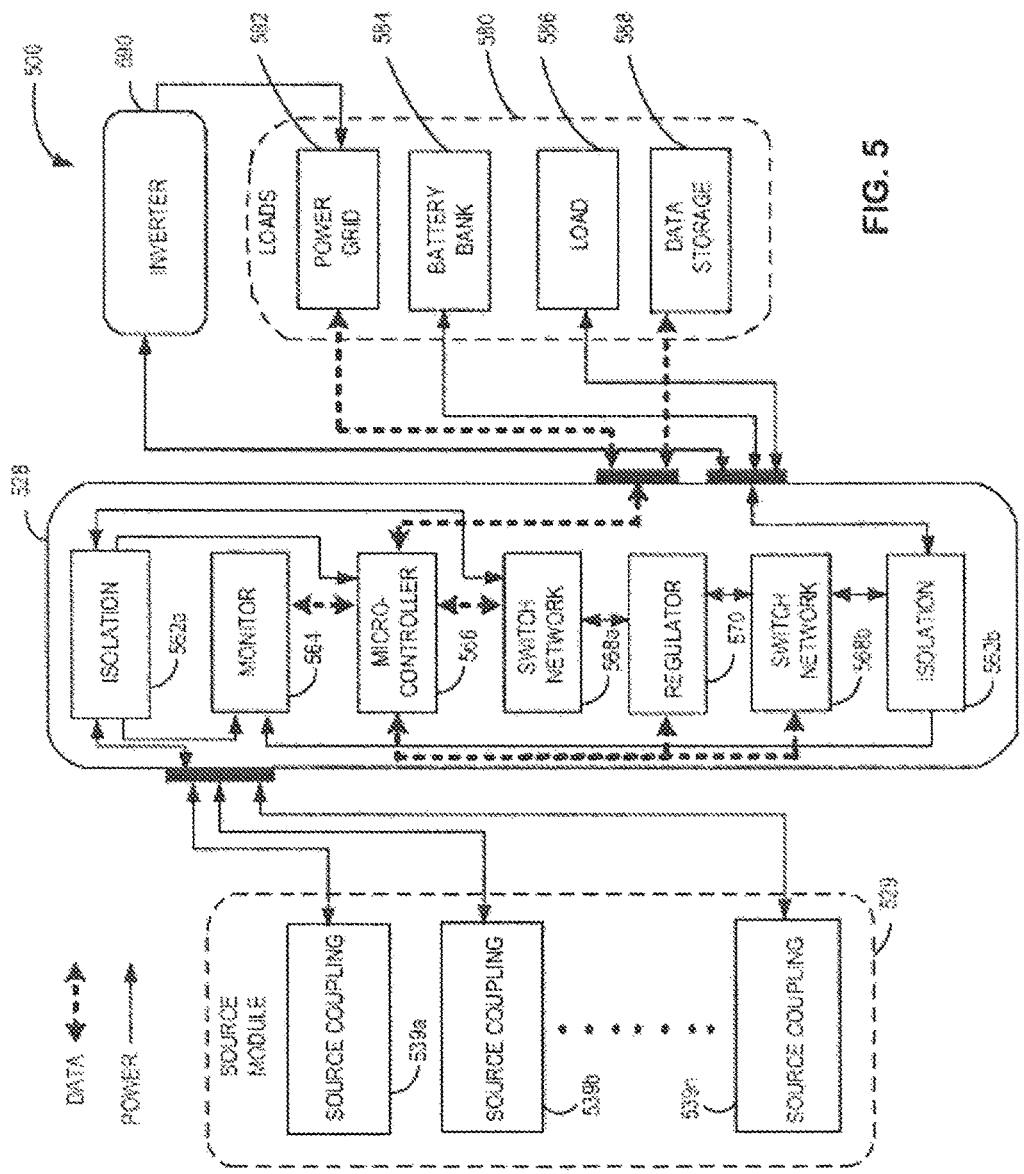
FIG. 5 is a schematic block diagram for an example controller in a power distribution system or power combiner-distribution system.

Electrical network 230 may have one or more regulators 270 to condition the voltage and currents of the electrical network, as described further with reference to FIG. 5. Example regulators 270 include one or more of a power converter, boost converter and an inverter. In some embodiments, one or more regulator may be used to condition the voltages and currents of respective power supplies 210a to 210n.

Electrical loads may be time-varying, whether referring to electrical loads 240a to 240n, or to power sources 210a to 210n when operated as load. Therefore controller 228 is configured to dynamically compute, recompute and reconfigure the energy storage elements to account for fluctuations in voltage and current by each power source 210a to 210n, varying voltages and currents supplied by each energy storage element 220a to 220n and varying loads 240a to 240n.

Switching frequencies may be determined according to one or more factors, such as switching losses, device charging characteristics (e.g., when charging a battery), current limits, ripple voltages and transistor turn on or turn off times.

Generally, switching losses are proportional to the switching frequency. For this reason, lower switching frequencies may be selected to minimize losses, subject to the other factors described herein.

Current limits imposed by system elements and, in particular, energy storage elements, may provide upper limits on switching frequency. For example, both input current limits and output current limits of each energy storage element may provide a bound on the switching frequency. Input current is the current that flows when the energy storage element is charging. Output current is the current that flows when the energy storage element is discharging.

Input or output current may be measured in various ways such as, for example, introducing a resistive element and measuring voltage drop, or using a Hall Effect sensor. However, resistive elements introduce losses, whereas Hall Effect sensors may not be cost-effective to implement.

In some embodiments, current may be measured in the capacitive elements of energy storage elements (e.g., capacitors) and by monitoring capacitor voltage. The capacitances of the capacitive elements may be determined by using capacitors with known capacitive values, or by using an in-circuit capacitance meter, which operates by using a known voltage and resistance and computes the capacitance based on the capacitor voltage.

FIG. 13 illustrates an example plot of voltage vs. time for a capacitor discharge. It can be observed that voltage decays exponentially as a function of time, such that:

$$V_2 = V_1 e^{\frac{-t}{RC}}$$

where $V_1$ is the voltage of the capacitor at time $t_0$, $V_2$ is the voltage of the capacitor at time $t_1$, and R is a known resistance that the capacitor is discharged through. Isolating for the capacitance, C, gives:

$$C = \frac{-t_1}{(\ln V_2 - \ln V_1)R}$$

Once capacitance is known, given only for small changes in voltage $\Delta V$, the current passing through the capacitor can be measured:

$$I = \frac{C}{t_{measure}} \cdot \Delta V$$

where $t_{measure}$ is the time in between voltage measurements of the capacitor.

Figure 10:
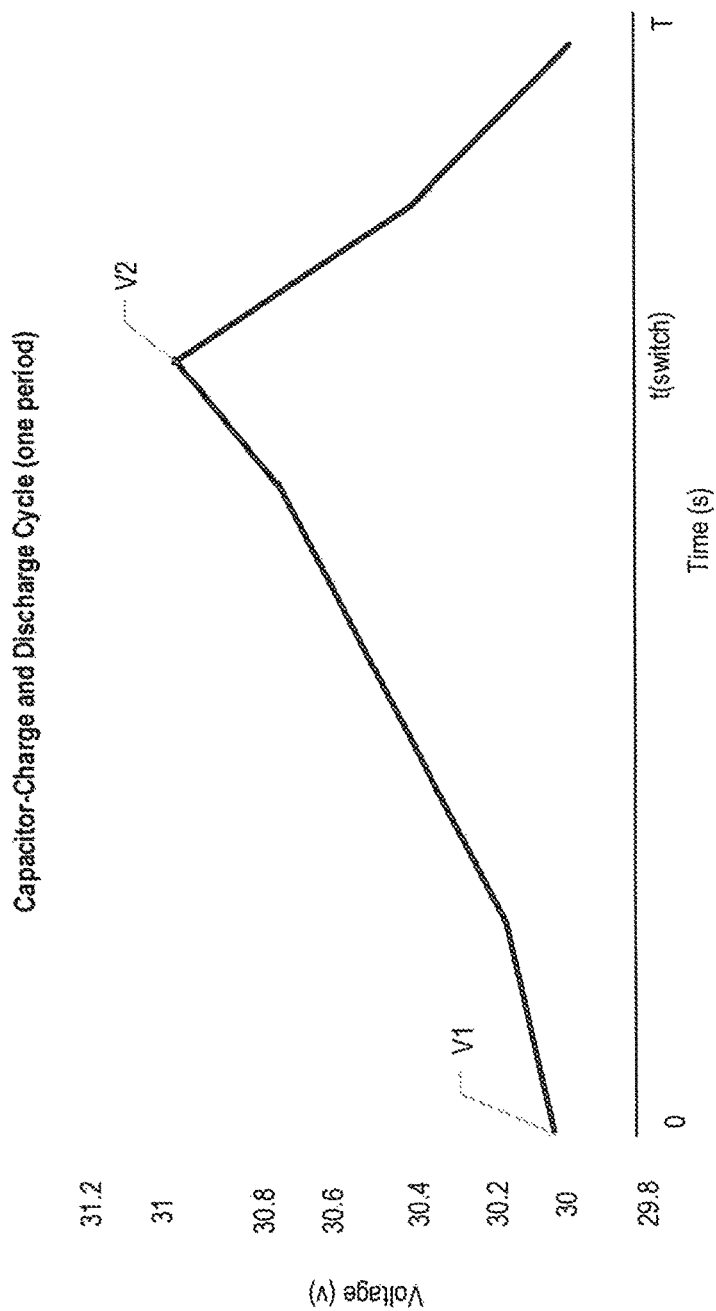
FIG. 10 is an example plot of capacitor voltage during a charge and discharge cycle.

Referring now to FIG. 10, there is illustrated an example plot of capacitor voltage during a charge and discharge cycle. FIG. 10 illustrates a charge/discharge cycle for a power combiner energy storage element, which generally has a longer charge cycle than a discharge cycle. A power distribution energy storage element generally will have a longer discharge cycle than a charge cycle.

The energy in the capacitor is a function of the voltage and can be determined according to the formula:

$$E(V) = \frac{CV^2}{2}$$

where E is the total energy stored in Joules, C is the capacitance of the capacitor in Farads, and V is the measured voltage in Volts.

As shown in FIG. 10, $V_1$ is the voltage at the beginning and end of the period T. $V_2$ is the peak voltage that is reached before the capacitor is switched, and begins to discharge at t(switch). The power discharged by the capacitor during the discharge cycle can be computed by determining the difference in energies $E(V_1)$ and $E(V_2)$ over the discharge time:

$$t_{discharge} = T - t(\text{switch})$$

$$P_{discharge} \approx \frac{E(V_2) - E(V_1)}{t_{discharge}}$$

Average discharging voltage can be determined from $V_1$ and $V_2$ in order to compute the output current:

$$V_{avg} \approx \frac{V_1 + V_2}{2}$$

$$I_{out} = \frac{P_{discharge}}{V_{avg}}$$

Similarly, the power charged to the capacitor during the charge cycle can be computed by determining the difference in energies $E(V_1)$ and $E(V_2)$ over the charge time:

$$t_{charge} = t(\text{switch}) - t(0)$$

$$P_{charge} \approx \frac{E(V_2) - E(V_1)}{t_{charge}}$$

Average charging voltage can be determined from $V_1$ and $V_2$ in order to compute the input current:

$$V_{avg} \approx \frac{V_1 + V_2}{2}$$

$$I_{in} = \frac{P_{charge}}{V_{avg}}$$

Generally, the ripple current rating of a capacitor used as an energy storage element should be the larger of $I_{in}$ and $I_{out}$. Ripple current can be determined from the ripple voltage (e.g., ($V_2-V_1$), which may be small), and knowledge of the discharged power.

For small changes in voltage (e.g., in the millivolt range, or less than 1 volt), decreasing the discharge time $t_{discharge}$ or the charge time $t_{charge}$ will cause a corresponding increase in the output ripple current $I_{out}$ or the input ripple current $I_{in}$.

A lower bound on the period, T, can be determined as follows:

$$T_{lower} = 2n \cdot t_{charge}$$

where n is the number of input power sources. Generally, for power distribution applications the charge time will be less than the discharge time.

Once $I_{in}$ and $t_{charge}$ are optimized based on the ripple current rating of the capacitor or energy storage element, the upper limit of the switching frequency can be found according to the known formula:

$$f_{upper} = \frac{1}{T_{lower}}$$

Ripple voltage limits imposed by system elements are also considered, since these will set a lower limit of the switching frequency. Generally, a small ripple voltage is preferred:

$$V_{ripple} = V_2 - V_1$$

Discharging power is computed and is approximately equal to the power ($P_{OOP}$) at the optimal operating point (OOP) of the load:

$$P_{discharge} \approx \frac{E(V_2) - E(V_1)}{t_{discharge}}$$

$$P_{discharge} \approx P_{OOP}$$

which leads to the combined equation:

$$\frac{CV_2^2}{2} - \frac{CV_1^2}{2} \approx P_{discharge} \cdot t_{discharge}$$

Since the capacitance, C, of the energy storage elements will be known, $V_1$ and $V_2$ can be determined after selecting a maximum allowable ripple voltage, $V_{ripplemax}$:

$$V_1 = V_{OOP} - \frac{V_{ripplemax}}{2}$$

$$V_2 = V_{OOP} + \frac{V_{ripplemax}}{2}$$

where $V_{OOP}$ is the voltage at the optimal operating point of the load.

An upper bound on the period can be solved for as follows, to determine a lower limit of the switching frequency:

$$T_{upper} = \frac{2n \cdot t_{discharge}}{2n - 1}$$

$$f_{lower} = \frac{1}{T_{upper}}$$

Transistor turn on and turn off time can also be considered, since transistors and other switching elements do not turn on or off instantaneously. Therefore frequency can be selected such that transistor dead times do not take up more than a pre-selected percentage of the period, T. For example, in an example 2 kW power distribution system, the dead time may be limited to less than 1% of the period.

Dead time may be computed as follows:

$$t_{DT} = t_{n+1[on]} - t_{n[off]}$$

$$t_{DT[total]} = 2n \cdot t_{DT}$$

where $t_{DT[total]}$ is the total dead time and $t_{DT}$ is the maximum consecutive dead time. An upper bound on frequency can be determined by using the relationship with the period as follows:

$$t_{DT} < 0.01 \cdot T$$

It can be observed that the frequency and period are proportional to the number of input sources or loads. Therefore, as power sources or loads are added to a power distribution system, larger capacitors or higher switching frequencies may be used, leading to higher ripple voltages and currents at any given frequency.

In some embodiments, controller 228 may have a sampling frequency in the range between 1-100 kHz, depending on the maximum frequency of the controller sampling inputs or the analog-digital converter, while the controller 228 itself may have any suitable operating frequency, e.g., in the 1 to 1000 MHz range, again depending on the available clock frequency.

Figure 3A:
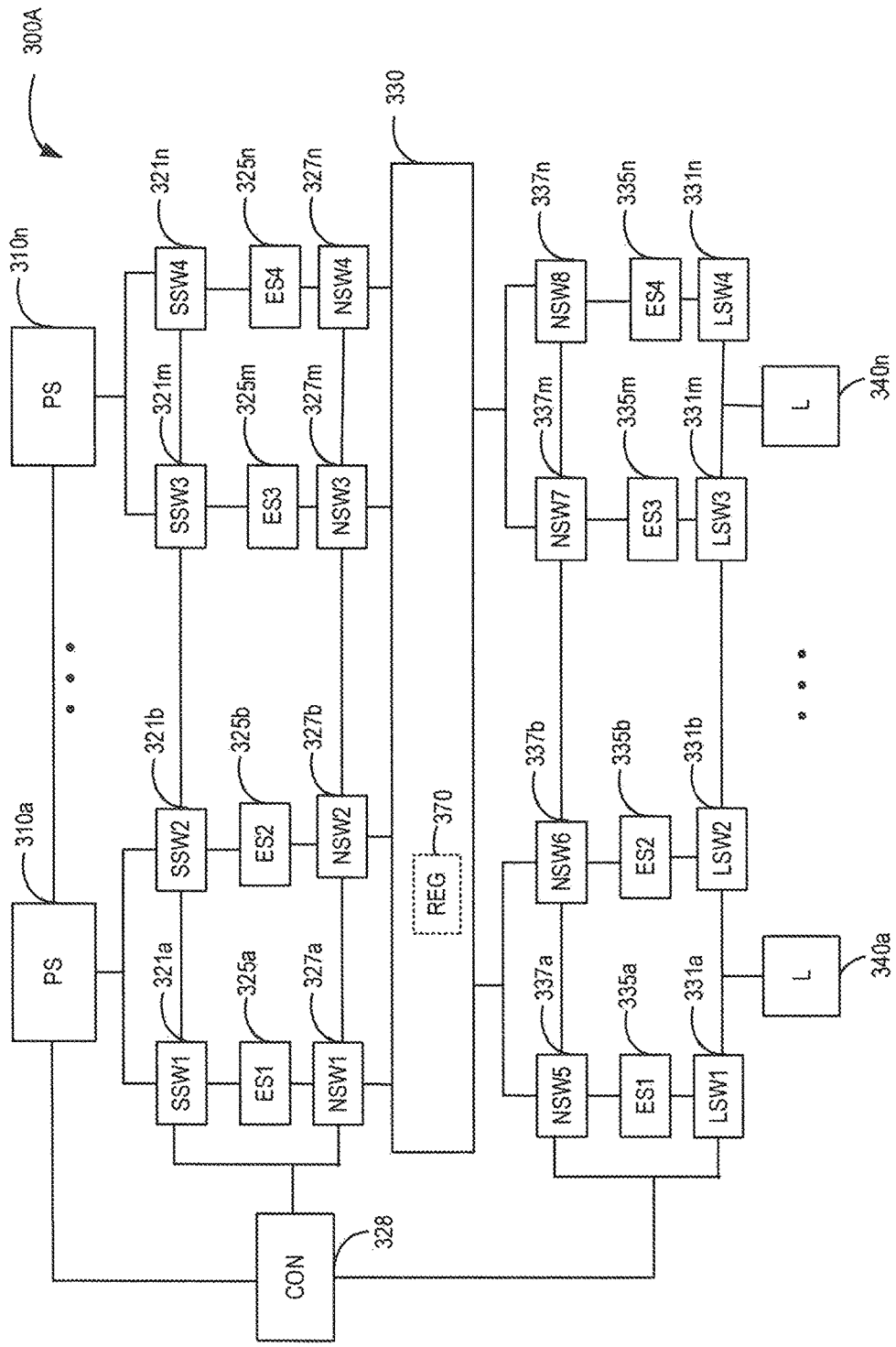
FIG. 3A is another example system for combining electrical power from a plurality of power sources and distributing to a plurality of loads.

Referring now to FIG. 3A, there is illustrated an example system for combining electrical power from a plurality of power sources, and distributing electrical power to a plurality of loads. Parts of system 300A can implement aspects of system 200 of FIG. 2, and therefore has a plurality of power sources 310a to 310n, which are electrically couplable to respective energy storage elements 325a to 325n.

Energy storage elements 325a to 325n are electrically couplable to power sources 310a to 310n via source-side switches 321a to 321n. Energy storage elements 325a to 325n are also coupled to electrical network 330. In some cases, electrical network 330 may be an electrical network having multiple nodes, links and switches, such as an electrical power grid. In other cases, electrical network 330 may be a simple circuit, a single electrically-conductive wire, or a bi-directional DC-DC converter or regulator, such as an optional regulator 370 as shown.

Each of energy storage elements 325a to 325n is couplable to power sources 310a to 310n under the control of controller 328. For example, controller 328 may transmit signals to source-side switches 321a to 321n, or to network-side switches 327a to 327n, or both, to cause an energy storage element to be coupled to a power source, or to the electrical network 330.

Similarly, energy storage elements 335a to 335n are electrically couplable to loads 340a to 340n via load-side switches 331a to 331n. Energy storage elements 335a to 335n are also coupled to network 330 via network-side switches 337a to 337n.

Each of energy storage elements 335a to 335n is couplable to loads 340a to 340n under the control of controller 328. For example, controller 328 may transmit signals to load-side switches 331a to 331n, or to network-side switches 337a to 337n, or both, to cause an energy storage element to be coupled to a load, or to the electrical network 330. Source-side switches 321a to 321n, network-side switches 327a, load-side switches 331a to 331n, and network-side switches 337a to 337n may be collectively referred to as the switch network.

Controller 328 is communicatively coupled to energy storage elements 325a to 325n and 335a to 335n, or to the respective source-side switches 321a to 321n, network-side switches 327a, load-side switches 331a to 331n, and network-side switches 337a to 337n, to operate the switches of the switch network and thereby controllably couple and decouple each energy storage element to and from its respective power source, and also to and from the electrical network 330 and to electrical loads 340a to 340n.

Source-side switches 321a to 321n, network-side switches 327a, load-side switches 331a to 331n, and network-side switches 337a to 337n can be, in some examples, transistors or power transistors, such as MOSFETs. Examples of suitable transistors include, but are not limited to, IRF3205 N-channel power MOSFETs manufactured by International Rectifier of El Segundo, Calif. The IRF3205 transistors are capable of driving up to 110 amps, are rated for operation at up to 55 volts, and can dissipate a maximum of 200 watts. Other suitable transistors for higher power applications include integrated gate bipolar junction transistors. Other switching devices may also be used in some embodiments, such as relays and bipolar junction transistors, although timing may be slowed to account for slower switching speeds, thereby impacting performance.

Depending on the type of switch device used, there may be restrictions on the operation of the switch network. For example, when MOSFET transistors are used, timing may be configured so that no current is conducted between energy storage elements across different power sources. In such cases, controller 328 can be configured to ensure that each energy storage element is isolated, for example through use of a guard period when switching.

Figure 11:
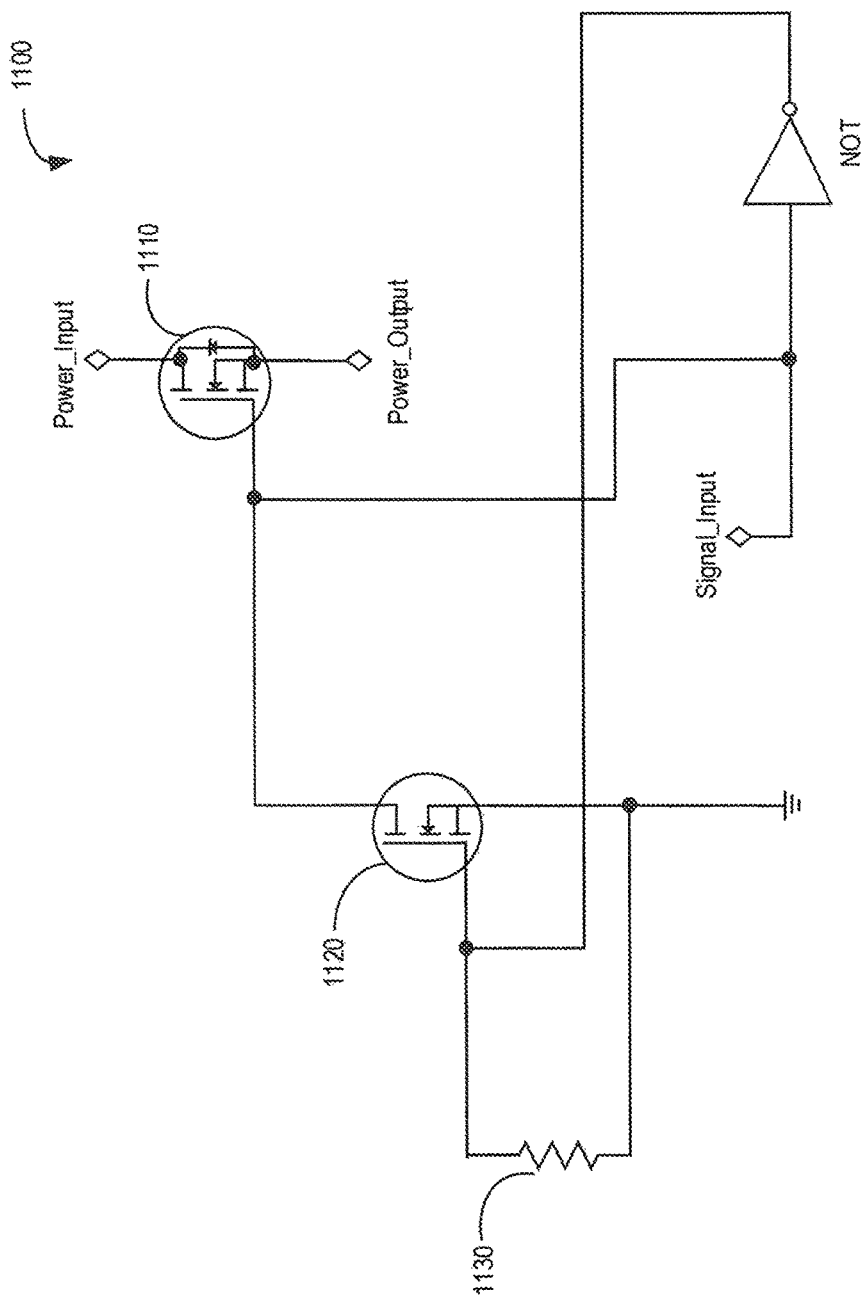
FIG. 11 is a circuit diagram of an example pull down circuit.

In some embodiments, pulldown transistors may be used. For example, low power, N-channel signal MOSFETs may be used to quickly pull down the gate of the main power MOSFET to ground, as illustrated in the example circuit 1100 of FIG. 11. Use of a pull down transistor compensates for the fact that, when it is desired to turn the power transistor off, its gate does not instantly drop to zero volts, due to a relatively large gate capacitance on higher power MOSFETs. A pull down transistor 1120 can be used at the gate of power transistor 1110 in order to quickly turn the power transistor 1110 off (by pulling it to ground). The pull down transistor 1120 may receive an inverted signal to the main power MOSFET. Examples of a suitable pull down transistor include, but are not limited to, a 2N7000 MOSFET.

In some cases, a pull down resistor can be used instead of a pull down transistor, or in addition to a pull down transistor (e.g., connected to the gate of a pull down transistor). In example circuit 1100, a pull down resistor 1130 is used at the gate of the pull down transistor 1120.

In some cases, switching of transistors may be aided with gate driver circuits, particularly in the case of high side switching. High side switching refers to the switching of transistors that are passing currents when the source voltage is not at ground (e.g., zero volts). With MOSFET power transistors, switching requires a gate-source voltage of at least about 10 volts to turn the transistor fully on (e.g., if the source voltage is 40 volts, a gate voltage of 50 volts is applied to turn the transistor fully on). Prior to being turned fully on, the transistor may be conducting, although with a high impedance.

Figure 12A:
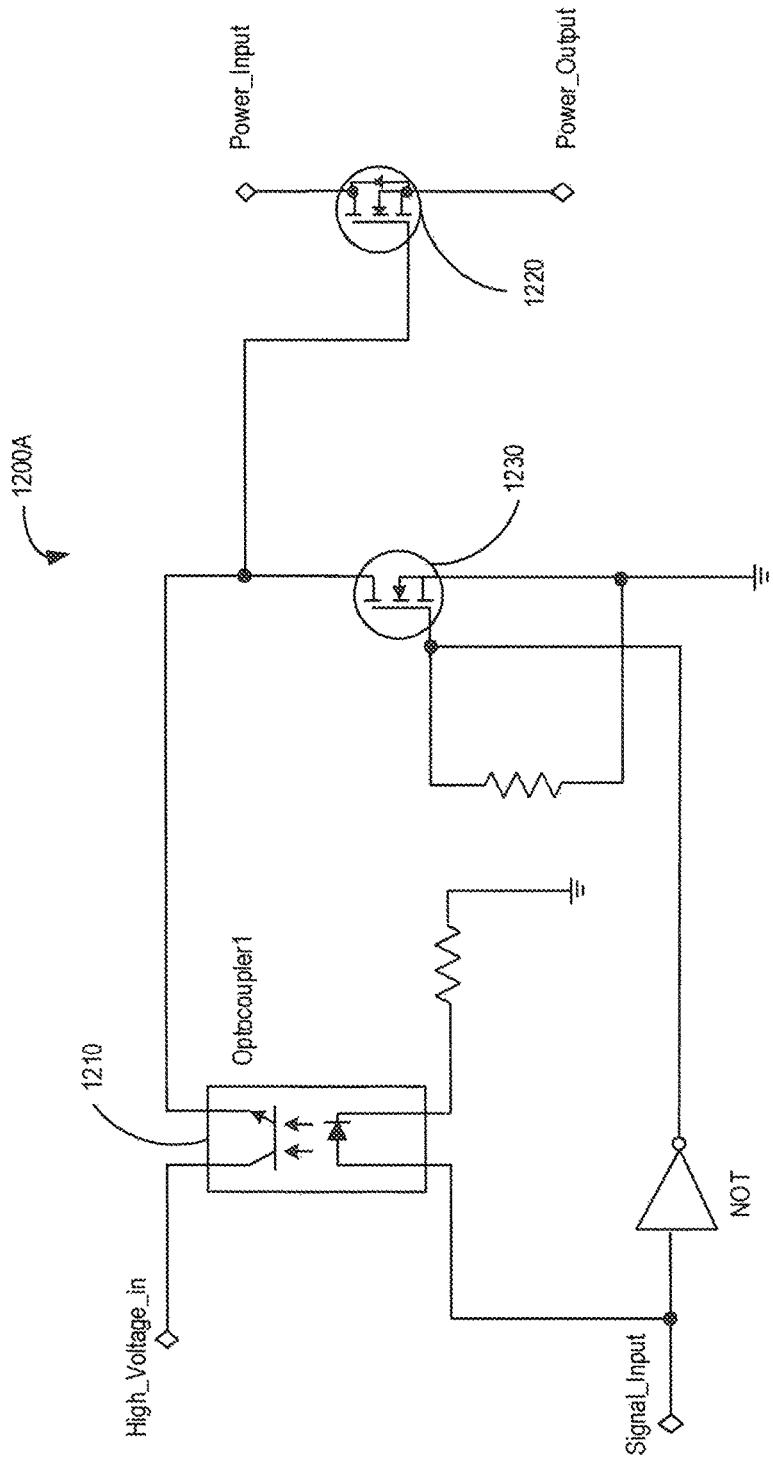
FIG. 12A is a circuit diagram of an example optocoupler-based gate driver circuit.

In some embodiments, an optocoupler can be used to couple high voltage switches with low voltage switches to facilitate high side switching. The high voltage switches can thereby be controlled by switching with low voltages. An example optocoupler driver circuit is illustrated in FIG. 12A, and has an optocoupler 1210, a pull down transistor 1230 and a power transistor 1220. The optocoupler is driven by a signal input, which allows coupling of a high voltage input to the power transistor 1220 or pull down transistor 1230, where the high voltage input is sufficient to drive the power transistor 1220. As can be seen, the pull down transistor 1230 is controlled by an inverted signal input.

One example optocoupler that may be used is the LTV 846 manufactured by Lite-On Electronics, Inc., which can switch at frequencies up to 80 kHz. The low voltage side of the optocoupler can be controlled by a processor, such as a processor of controller 428.

Figure 12B:
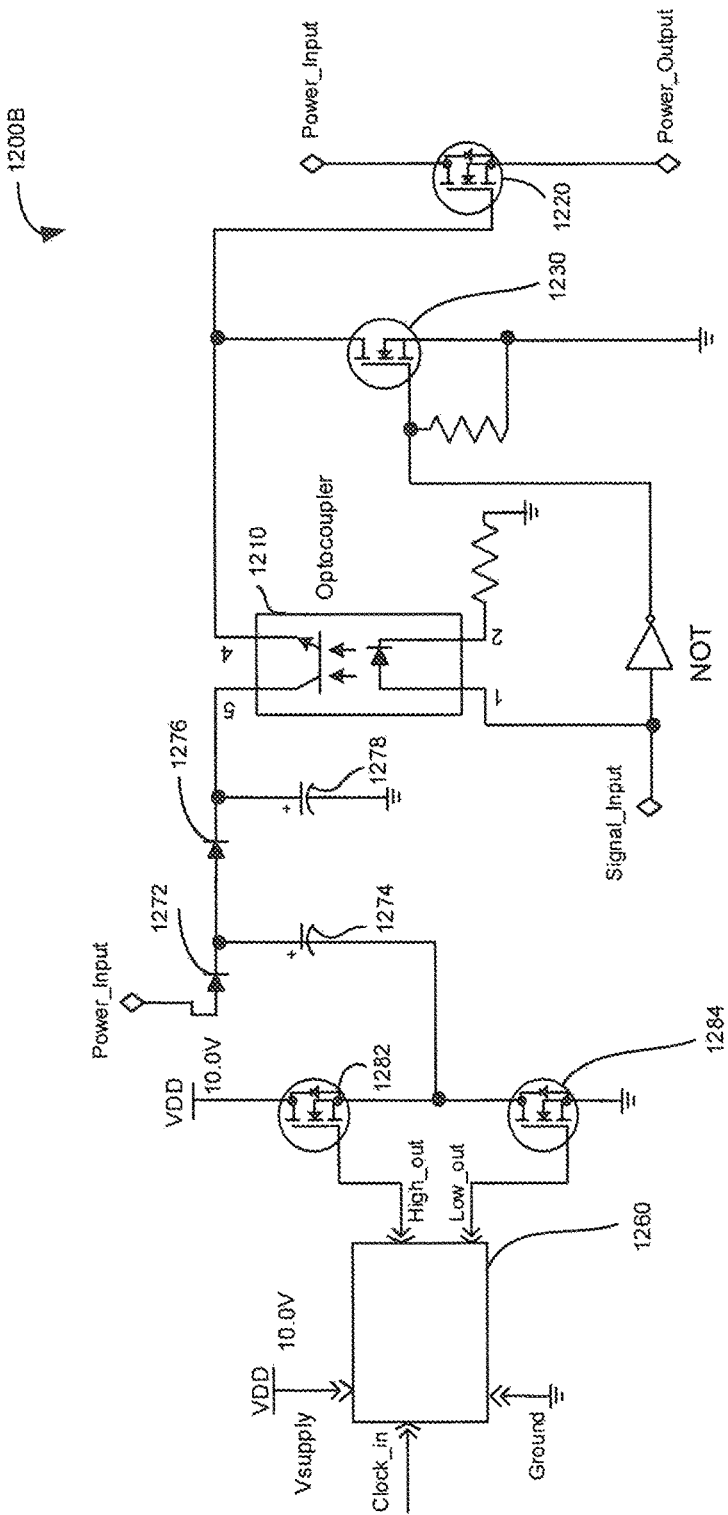
FIG. 12B is a circuit diagram of an example optocoupler-based gate driver circuit with a charge pump.

The high voltage input to the optocoupler can be produced, for example, by a charge pump, which may be a DC-DC converter that steps up voltages. In one example gate driver configuration as illustrated in FIG. 12B, the input to the charge pump may be the same as the drain voltage of the main power MOSFET. Each stage of the charge pump has a diode 1272 and a capacitor 1274 (or diode 1276 and capacitor 1278) that can add a voltage equal to Vdd (e.g., 10 V) to the gate driver circuit input. The charge pump can be driven by two MOSFETS 1282 and 1284 in a synchronous half bridge (e.g., transistors 1282 and 1284 receive inverted gate signals). The charge pump may be driven by a suitable driver 1260, such as the ADP3120A dual bootstrapped MOSFET driver manufactured by ON Semiconductor. An example optocoupler configuration is described with reference to FIG. 6. Optocouplers may be employed in similar fashion to isolate inputs to the switch network in a power distribution or combined power combiner-power distribution system, like that of FIG. 3A.

The gate driver circuit 1200A can be duplicated for each of the high side transistors in a power distribution system. Components such as the charge pump can be shared between gate driver circuits 1200A or 1200B, however at least one charge pump per load can be provided.

In some embodiments, a dedicated gate driver integrated circuit can be used to drive the high side transistor gates, but this may necessitate multiple gate drivers, increasing cost.

Figure 14:
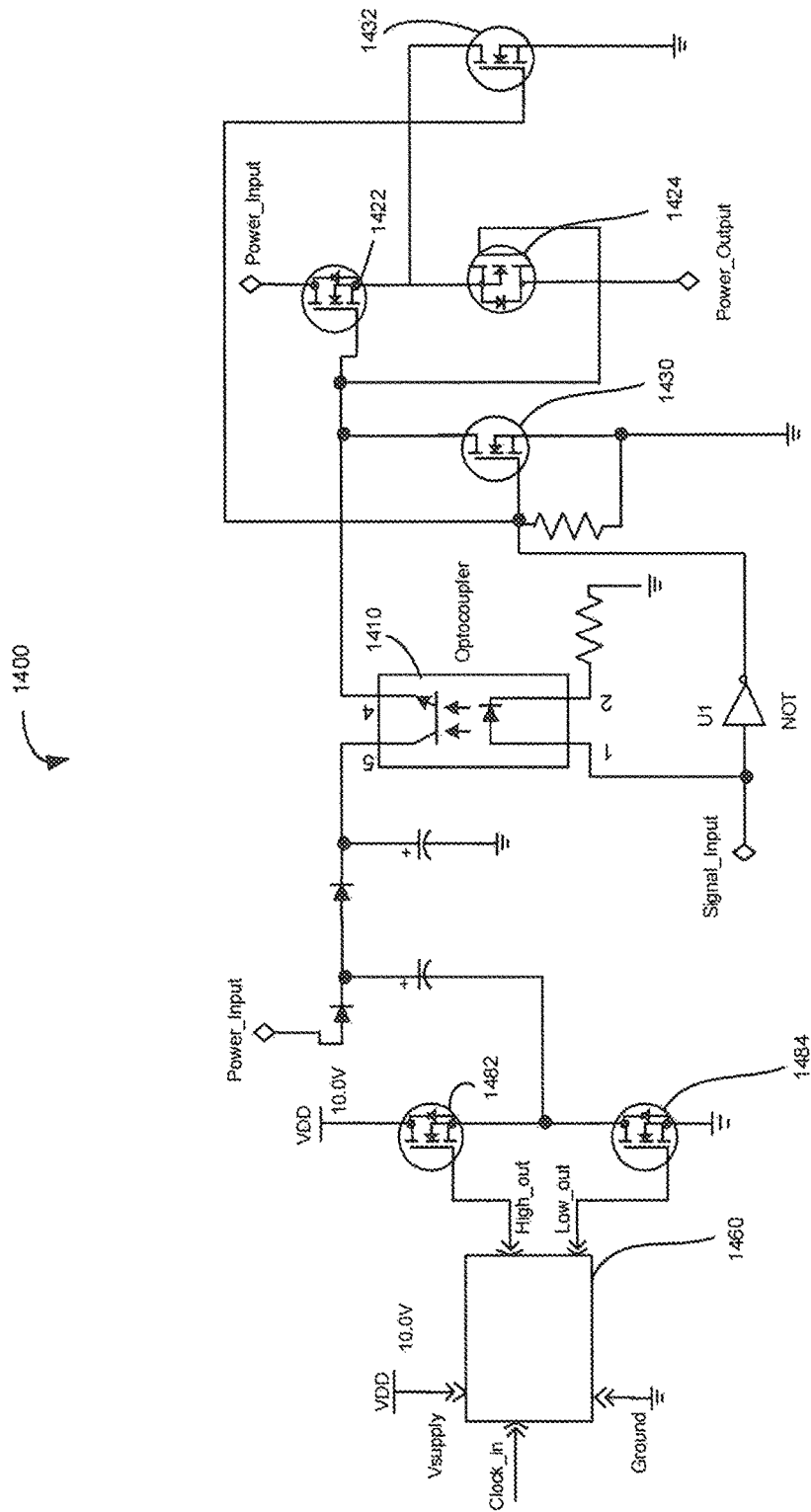
FIG. 14 is a circuit diagram of another example optocoupler-based gate driver circuit with a charge pump.

In some embodiments, a switching circuit may employ source-to-source transistors to reduce or eliminate leakage current while in the off state. Referring now to FIG. 14, there is illustrated another example gate driver circuit 1400. Gate driver circuit is analogous to gate driver circuit 1200B, but replaces power transistor 1220 with source-to-source connected MOSFETs 1422 and 1424.

In their off state, MOSFETs may leak a small amount of current. However, to fully isolate inputs in system 200, small leakages may be prevented by arranging two power transistors source to source.

In the circuit 1400, transistor 1424 protects against leakage current. The gate of transistor 1424 is pulled down by the same pull down transistor as transistor 1422. The connected sources of transistors 1422 and 1424 can be to be pulled down to ground by pull down transistor 1432, to ensure that any small leakage current between the MOSFETs is pulled to ground.

Alternatively, in some embodiments, a power transistor may have a diode placed in series with the source of the MOSFET to prevent leakage current. However, the diode has a forward voltage drop which may reduce efficiency.

Energy storage elements 325a to 325n, and 335a to 335n, can be, in some examples, capacitors. In some embodiments, energy storage elements may be aluminum electrolytic capacitors (e.g., 10 mF 50V capacitor SLPX103M050E7P3 manufactured by Cornell Dubilier Electronics, which is rated for ripple currents of up to 5.08 A). Aluminum electrolytics are a good option because they have large capacitances at relatively high voltages. In some cases, energy storage elements can be connected in parallel to double the ripple current and capacitance, or connected in series to double the rated voltage.

Large capacitance leads to lower switching frequencies, which in turn leads to lower switching losses. However, higher capacitances generally use larger-sized capacitors that are typically rated at lower voltages, cost more, and take up more space.

Other electrical energy storage elements may be used, but for efficient and cost effective operation (e.g., at 2 kW) capacitors can be used.

Controller 328 generally is a computing device with a processor, memory and input/output hardware, such as a serial or parallel communications interface. In some cases, controller 328 may be equipped with a network communications interface for monitoring and control of energy storage elements or their switches. The memory of controller 328 may be volatile or non-volatile, or a combination of both. The memory stores computer-readable and executable program code, which directs the controller 328 to execute one or more control programs as described herein.

Generally, controller 328 monitors voltages from voltage sensors (not shown) at each of source-side switches 321a to 321n, network-side switches 327a, load-side switches 331a to 331n, and network-side switches 337a to 337n and uses the determined voltage to dynamically determine a respective state of each of the one or more energy storage characteristic of each energy storage element, as described herein. In some embodiments, controller 328 may directly monitor voltages and currents from energy storage elements, where such data signals are available.

Figure 9:
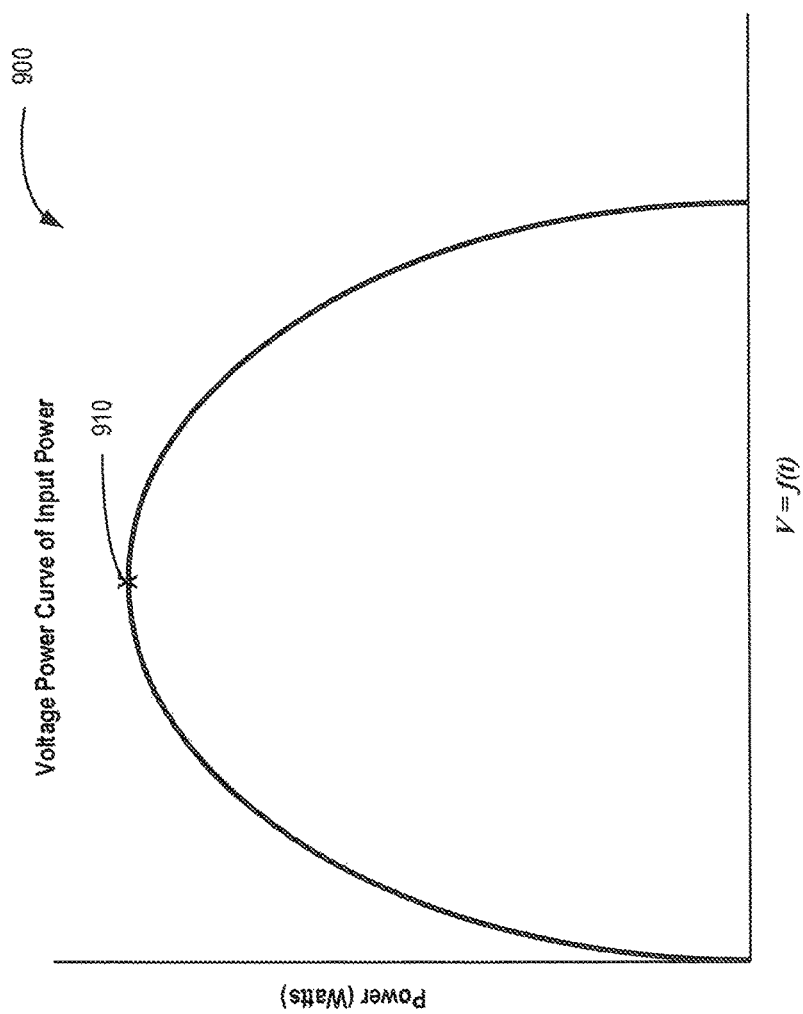
FIG. 9 is an example plot of power versus voltage over time for input power source.

In embodiments where the energy storage elements are capacitors, or include a capacitor as an energy store, the state can include, but is not limited to, the energy stored in the capacitor. As noted above, energy in capacitors can be determined by measuring voltage across the capacitor and determining an energy level according to the formula:

$$E = \frac{CV^2}{2}$$

where E is the total energy stored in Joules, C is the capacitance of the capacitor in Farads, and V is the measured voltage in Volts. The change in energy stored in a capacitor over time can be used to determine the output power of a power source. This characteristic can in turn be used by controller 328 to determine the maximum power point of the power source, because as the voltage across the capacitor changes, the rate of charge will also change as illustrated in FIG. 9.

Once the maximum power point of each power source is determined, controller 328 can automatically select which of the energy storage elements 325a to 325n to be coupled to the electrical network 330 or to one or more power source 310a to 310n. In some embodiments, controller 328 can select the energy storage element for coupling in such a manner as to maintain the voltage of each energy storage element at the voltage that provides for the maximum power point of its respective input power source.

Similarly, for power distribution, once power at the optimal operating point of a load is determined, the controller can automatically select which of the energy storage elements 335a to 335n to be coupled to the electrical network 330 or to one or more loads 340a to 340n. In some embodiments, controller 328 can select the energy storage element for coupling in such a manner as to maintain the voltage of each energy storage element at the voltage that corresponds to the optimal operating point of the load.

Based on the respective state of each of the energy storage elements, the controller 328 dynamically determines an output configuration that provides an optimal or maximum power output from each power source, or in some cases an optimal power transfer to a load, and accordingly dynamically causes at least one output element to be coupled to electrical network 330 (e.g., an output).

Example regulators 370 include one or more of a power converter, boost converter and an inverter.

Electrical loads may be time-varying, therefore controller 328 is configured to dynamically monitor, compute, recompute and reconfigure the energy storage elements to account for fluctuations in voltage and current from each power source 310a to 310n, varying voltages and currents supplied by each energy storage element 325a to 325n, 335a to 335n and varying loads. In some embodiments, controller 328 may have a sampling frequency in the range between 1-100 kHz, while the controller 328 itself may have any suitable operating frequency, e.g., in the 1 to 1000 MHz range, depending on the controller sampling frequency and operating frequency.

Generally, for power combining, controller 328 determines the charge rate of the energy storage elements, for example by monitoring the amount of energy stored in the energy storage elements over time. The maximum power point of each energy storage element 325a to 325n can be determined by searching for the voltage that produces the highest charge rate for each of the energy storage elements in a respective set. The search can be optimized by limiting the search space within the tolerances of the energy storage elements and the switching network, along with the maximum and minimum desired output power, voltage or current.

Generally, for power distribution, controller 328 determines the discharge rate of the energy storage elements 335a to 335n, for example by monitoring the amount of energy stored in the energy storage elements over time. The optimal operating point of each load 340a to 340n can be preprogrammed from load specifications or in some cases can be determined by searching for the voltage that produces the optimal load performance, or a combination of both. The search can be optimized by limiting the search space within the tolerances of the energy storage elements and the switching network, along with the maximum and minimum desired output power, voltage or current.

Figure 7A:
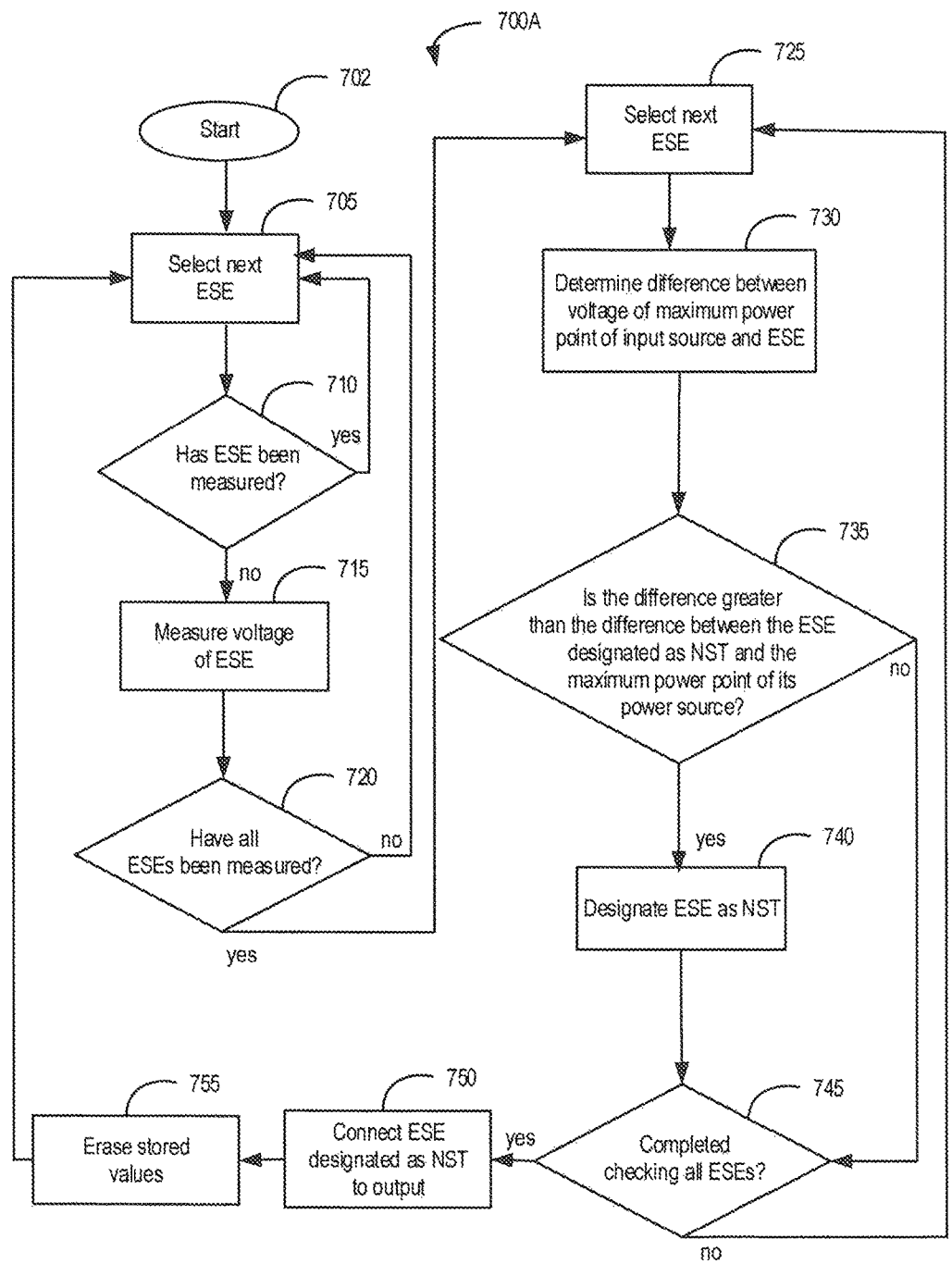
FIG. 7A is a process flow diagram for an example control method.

Referring now to FIG. 7A, there is illustrated an example power combining control method in accordance with some embodiments in which the system is configured to combine power from a plurality of input power sources to one or more loads. Control method 700A may be carried out periodically at a suitable operating frequency, for example, by controller 328 of system 300A or 300B.

Control method 700A begins at 702 with a system 300A or 300B in operation. At 705, controller 328 selects a next energy storage element to be measured from the plurality of energy storage elements 325a to 325n. If no energy storage element has yet been measured, controller 328 selects a first energy storage element to be measured.

At 710, controller 328 determines if the voltage of the currently selected energy storage element has been measured within a current measurement window. If yes, controller 328 returns to 705 to select a next energy storage element. If not, a voltage measurement may be obtained at 715.

If there are further energy storage elements to be measured, controller 328 may return to 705 at decision triangle 720. If all energy storage elements have been measured in the current measurement window, controller 328 proceeds to 725 to begin determining the differences between the measured energy storage element voltage and the maximum power points of their respective power sources.

At 725, controller 328 selects a next energy storage element to be analyzed from the plurality of energy storage elements 325a to 325n. If no energy storage element has yet been analyzed, controller 328 selects a first energy storage element to be analyzed.

At 730, controller 328 determines the difference between the voltage of the selected energy storage element and the voltage provided by the respective power source at its maximum power point (as computed by controller 328 over time). For example, if the currently selected energy storage element is energy storage element 325m, controller 328 computes the difference between the measured voltage at energy storage element 325m and the voltage provided by power source 310n at its maximum power point.

At 735, controller 328 determines whether the computed difference is greater than the difference computed for an energy storage element designated as "NST," indicating that it is the next storage element to be coupled to electrical network 330. If the difference is greater, then the currently selected energy storage element is designated as "NST" instead at 740. Otherwise, controller 328 proceeds to 745 to determine whether there are additional energy storage elements to analyze, and can proceed to 725 if so.

Once there are no further energy storage elements to be analyzed, controller 328 can operate the switch network at 750 as described herein to connect the energy storage element designated as NST to the electrical network 330.

Optionally, controller 328 can erase any stored measurements at 755.

Controller 328 can then proceed to 705 to begin a new measurement window.

In some embodiments, controller 328 may be configured to enforce a minimum or maximum output power when selecting energy storage elements to be connected to the electrical network 330.

Figure 7B:
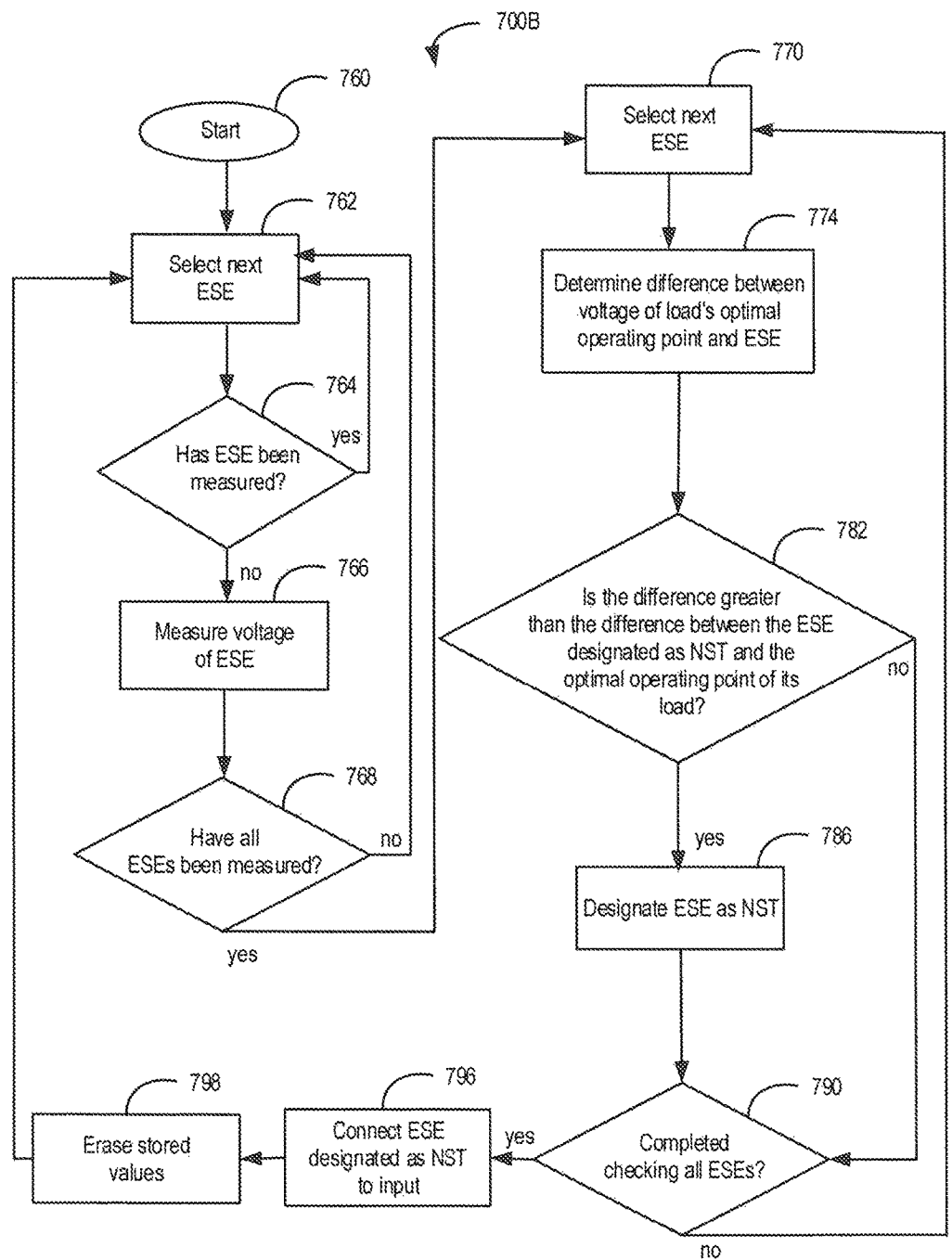
FIG. 7B is a process flow diagram for another example control method.

Referring now to FIG. 7B, there is illustrated an example power combining control method in accordance with some embodiments in which the system is configured to distribute power from electrical network 330 to one or more loads. Control method 700B may be carried out periodically at a suitable operating frequency, for example, by controller 328 of system 300A.

Control method 700B begins at 760 with a system 300A in operation. At 762, controller 328 selects a next energy storage element to be measured from the plurality of energy storage elements 335a to 335n. If no energy storage element has yet been measured, controller 328 selects a first energy storage element to be measured.

At 764, controller 328 determines if the voltage of the currently selected energy storage element has been measured within a current measurement window. If yes, controller 328 returns to 762 to select a next energy storage element. If not, a voltage measurement may be obtained at 766.

If there are further energy storage elements to be measured, controller 328 may return to 762 at decision triangle 768. If all energy storage elements have been measured in the current measurement window, controller 328 proceeds to 770 to begin determining the differences between the measured energy storage element voltage and the maximum power points of their respective power sources.

At 770, controller 328 selects a next energy storage element to be analyzed from the plurality of energy storage elements 335a to 335n. If no energy storage element has yet been analyzed, controller 328 selects a first energy storage element to be analyzed.

At 774, controller 328 determines the difference between the voltage of the selected energy storage element and the voltage at the optimal operating point for its load (as computed by controller 328 over time or preprogrammed from load specifications). For example, if the currently selected energy storage element is energy storage element 335m, controller 328 computes the difference between the measured voltage at energy storage element 335m and the voltage of load 340n at its optimal operating point.

At 782, controller 328 determines whether the computed difference is greater than the difference computed for an energy storage element designated as "NST," indicating that it is the next storage element to be coupled to the load. If the difference is greater, then the currently selected energy storage element is designated as "NST" instead at 786. Otherwise, controller 328 proceeds to 790 to determine whether there are additional energy storage elements to analyze, and can proceed to 770 if so.

Once there are no further energy storage elements to be analyzed, controller 328 can operate the switch network at 796 as described herein to connect the energy storage element designated as NST to the desired electrical network.

Optionally, controller 328 can erase any stored measurements at 798.

Controller 328 can then proceed to 760 to begin a new measurement window.

Methods 700A and 700B may be carried out concurrently, with method 700A used to maintain the voltage of electrical network 330 at a desired voltage and power level, and method 700B used to distribute power from electrical network 330 to loads 340a to 340n.

Referring again to FIG. 3A, it is seen that each power source has at least two energy storage elements associated therewith in an energy storage element set. In some cases, more than two energy storage elements may be provided in the energy storage element set.

Each energy storage element has a network-side switch connecting it to the electrical network and either a corresponding source-side switch connecting it to its power source or a load-side switch connecting it to is load. For example, energy storage element 325a has a source-side switch 321a for connection to power source 310a, and a network-side switch 327a for connection to electrical network 330. By operating the switch network, controller 328 can disconnect any one or more of the energy storage elements from its respective power source and connect it to the electrical network 330. For example, by closing switch 321a and opening switch 327a, energy storage element 325a may be connected to power source 310a in order to charge, while being decoupled from electrical network 330. Correspondingly, source-side switch 321b can be opened and network-side switch 327b may be closed, to couple energy storage element 325b to electrical network 330 and thereby provide stored power. In this way, power source 310a can provide power to at least one of the energy storage elements in the set (i.e., energy storage element 325a and 325b), while the other of the storage elements may be providing power to electrical network 330. By modulating the output of energy storage elements 325a and 325b, an efficient power transfer can be achieved.

Similarly, by closing switch 331a and opening switch 337a, energy storage element 335a may be connected to load 340a in order to supply power to the load, while being decoupled from electrical network 330. Correspondingly, load-side switch 331b can be opened and network-side switch 337b may be closed, to couple energy storage element 335b to electrical network 330 and thereby charge the energy storage element 335b. In this way, load 340a can be powered by at least one of the energy storage elements in the set (i.e., energy storage element 335a and 335b), while the other of the storage elements may be charged from electrical network 330. By modulating the output of energy storage elements 335a and 335b, an efficient power transfer can be achieved.

In some embodiments, source-side switches can be controlled in such a way that power source couplings between energy storage elements in a given set are isolated from one another in a form of time division multiplexing. Likewise, network-side switches can be controlled in similar fashion.

In some embodiments, only one selected energy storage element from the plurality of energy storage elements 325a to 325n will be connected to electrical network 330 at any given time. However, another energy storage element from the plurality of energy storage elements 335a to 335n may also be connected to electrical network 330 concurrently.

In some other embodiments, where there is more than one energy storage element set, multiple energy storage elements—generally one per set—may be coupled to electrical network 330 at a time (and decoupled from their respective power sources). This may be done, for example, to smooth variances in the voltage of electrical network 330. Likewise, independent power sources may be charged by one energy storage element per set. In some cases, one power source may be charged, while another is providing energy to electrical network 330 and loads 340a to 340n.

Figure 3B:
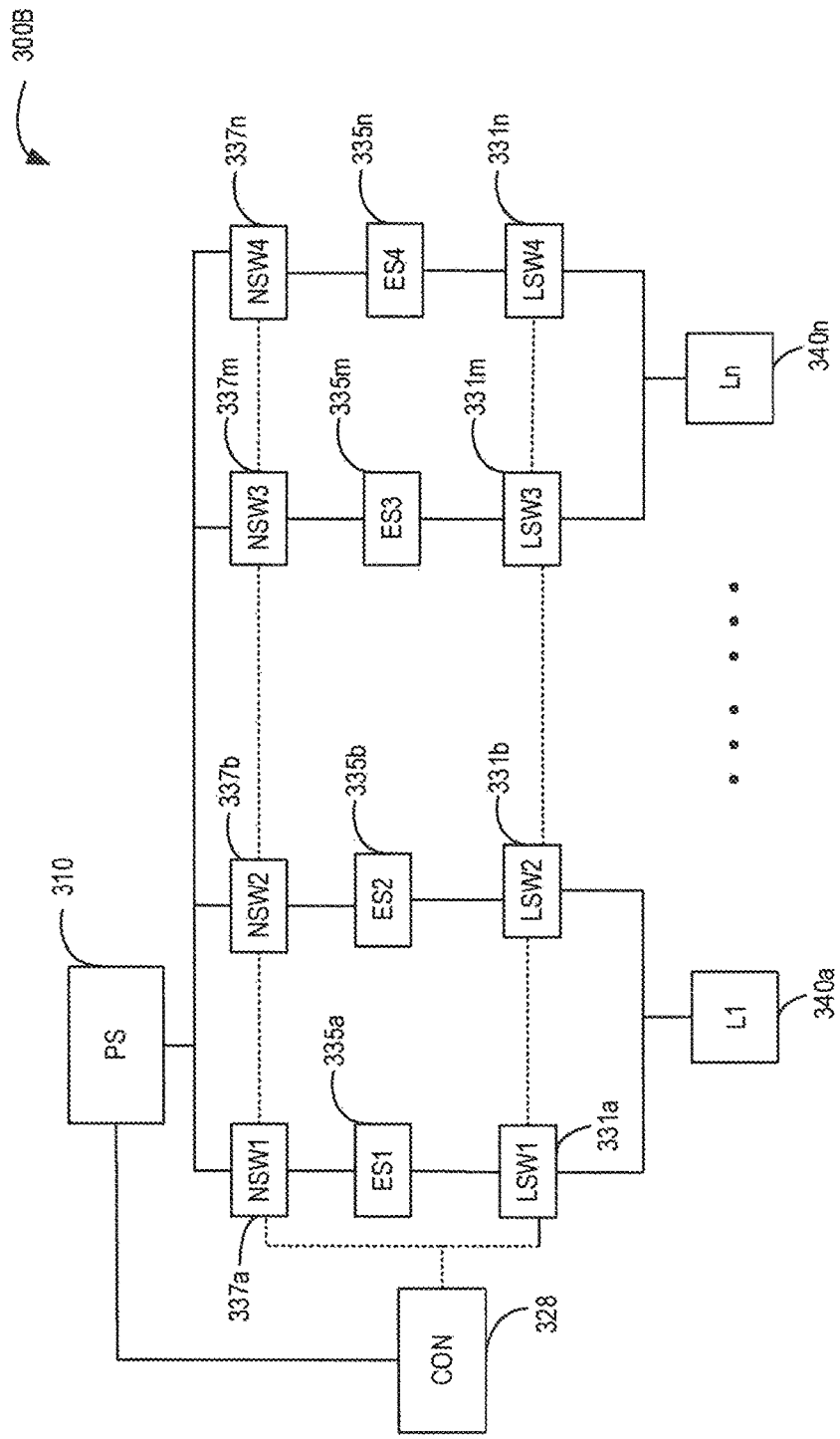
FIG. 3B is an example system for distributing electrical power from a power source to a plurality of loads.

Referring now to FIG. 3B, there is illustrated an example system for distributing electrical power from one power source to a plurality of loads. Power distribution system 300B provides a subset of the features of system 300A of FIG. 3A, and like numbered elements of systems 300B are therefore analogous to the corresponding elements of system 300A.

in contrast to system 300A, system 300B has a single power source 310 and omits the power combiner circuit that comprises source-side switches 321a to 321n, energy storage elements 325a to 325n and network-side switches 327a to 327n. In practice, however, the illustrated power source 310 may be comprised of multiple distinct power sources which are treated as a single source with a common output voltage. Source 310 is electrically coupled to network-side switches 337a to 337, for distributing power to a plurality of electrical loads 340a to 340n, which are themselves directly connected to load-side switches 331a to 331n. Each electrical load 340a to 340n is independent of the other, allowing for a plurality of load voltages to be provided by controller 328.

Each electrical load 340a to 340n may be an effective load that represents a plurality of devices or electrical networks, although these are not shown so as not to obscure the illustrated embodiments.

As with system 300A, system 300B allows for control of output over a wide range of voltages and currents.

In some embodiments, aspects of system 300A and 300B can be used to provide a battery management system (BMS) in which batteries may be controllably charged and discharged. In such a case, a battery may be treated as a power source when providing power to the circuit (e.g., discharging the battery), and as a load when drawing power from the circuit (e.g., charging the battery).

In one example, systems 300A or 300B may be used to provide a battery cell balancing system, to balance individual cells of a multi-cell battery pack, while charging. Conventional battery balancing techniques use discrete charge and discharge cycles, which operate sequentially. However, systems 300A or 300B may be used to simultaneously charge some cells, while temporarily omitting others, to balance during the charging cycle. Such an approach, for example in an electric vehicle battery system, can improve charge times and efficiency.

Figure 16A:
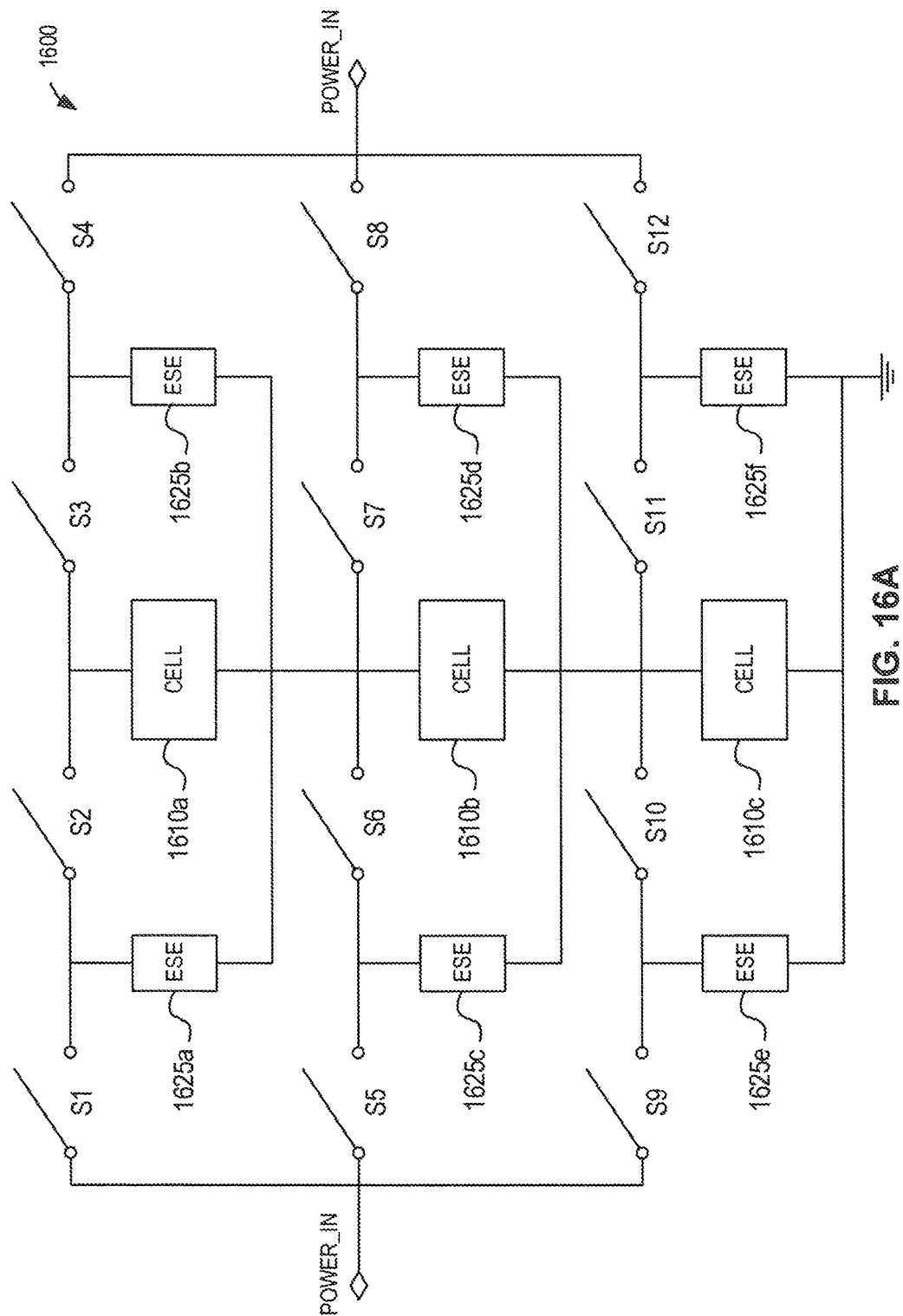
FIG. 16A is an example system for balancing charging of a plurality of battery cells.

Referring now to FIG. 16A, there is illustrated an example system for distributing electrical power from a power source to a plurality of battery cells. Power distribution system 1600 is an example implementation of system 300B of FIG. 3B.

Figure 18:
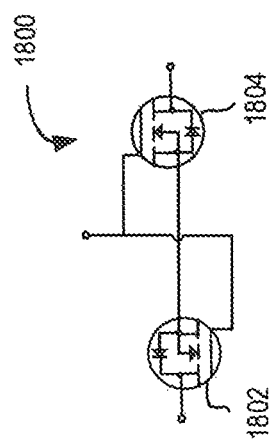
FIG. 18 is an example switch for use with the system of FIG. 16A or 16B.

In the example of FIG. 16A, ideal switches are shown, however in practice other types of switches may be used. FIG. 18 illustrates one form of suitable switch circuit, which has a source-source transistor arrangement, with the source of transistor 1802 coupled to the source of transistor 1804. The gates of transistors 1802 and 1804 are also coupled together, and used to control operation of the switch. This placement of source-to-source transistors can prevent leakage without the use of an external diode.

System 1600 has three battery cells 1610a, 1610b and 1610c. Each battery cell has two energy storage elements associated therewith. Energy storage elements 1625a and 1625b are associated with battery cell 1610a; energy storage elements 1625c and 1625d are associated with battery cell 1610b; and energy storage elements 1625e and 1625f are associated with battery cell 1610c. In some embodiments, the energy storage elements are capacitors. A series of controllable switches S1 to S12 is provided, although control connections are not shown to ease explanation.

Power from a power source (not shown) is provided via inputs at POWER_IN, which may electrically coupled. Both inputs may be provided by a single power source.

In operation, cell 1610a can be charged by energy storage element 1625a when switch S1 is open and switch S2 is closed. At the same time, energy storage element 1625b can be charged when switch S3 is open and switch S4 is closed. In operation only one energy storage element will be coupled to POWER_IN at a time, while the remaining energy storage elements can be coupled to their respective battery cells.

The switches can be operated to alternately charge one energy storage element and discharge the remaining energy storage elements (thus charging the battery cells). Similarly, in circuits with multiple loads, one energy storage element may be connected to a power source, with the remaining energy storage elements connected to the loads, respectively.

In some embodiments, system 1600 may use similar gate drivers and pull down circuits as those used with the other embodiments described herein. In some embodiments, gate drivers and pull down systems can be integrated into a single integrated circuit.

Figure 16B:
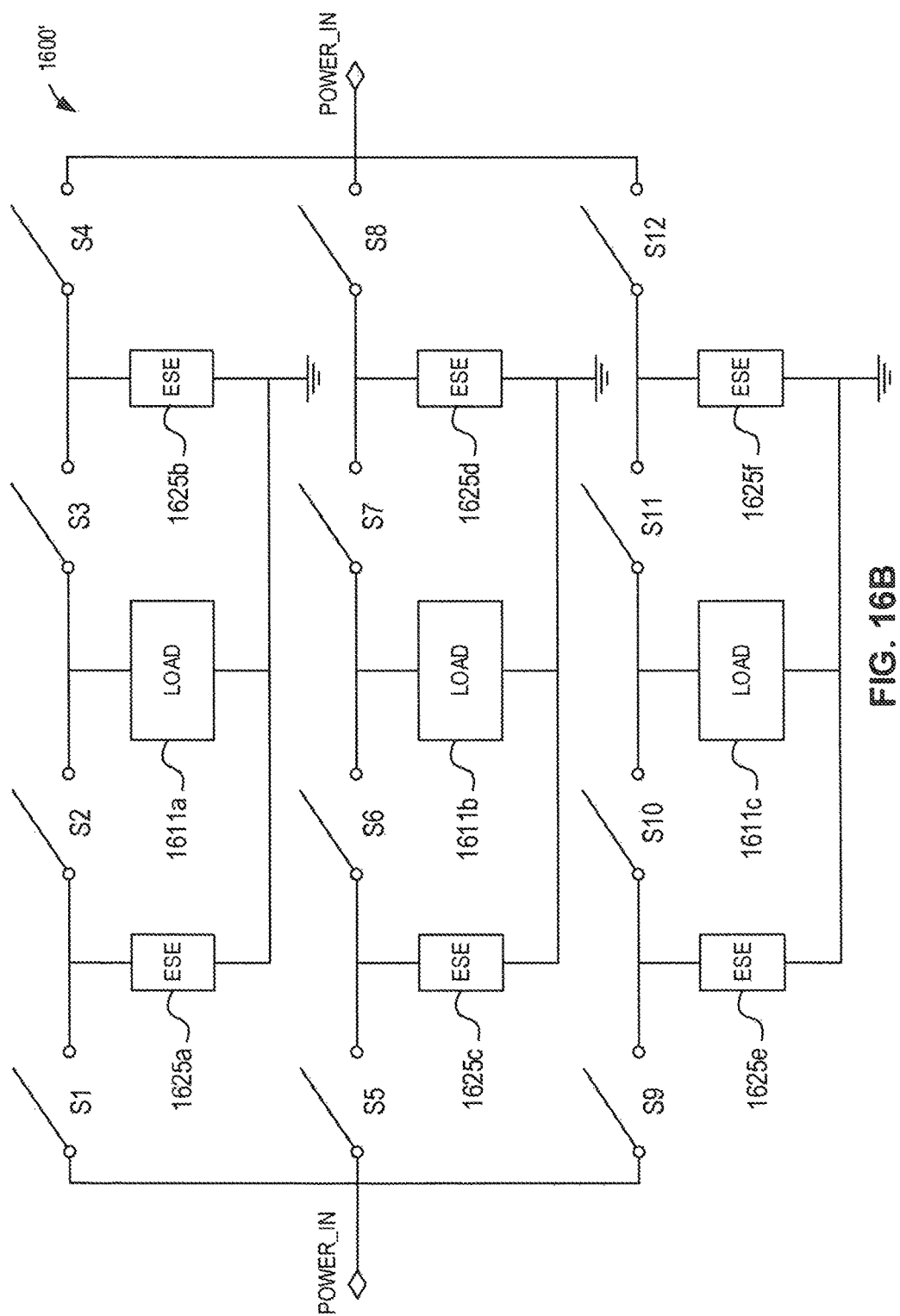
FIG. 16B is an example system for distributing electrical power from a power source to a plurality of disparate loads.

Referring now to FIG. 16B, there is shown an example variant of a system for distributing electrical power from a power source to a plurality of disparate loads. Power distribution system 1600' is generally analogous to system 1600 of FIG. 16A, and like numbered elements are also analogous.

Although similar to the battery management system of system 1600, system 1600' can be used as a power regulator and distributor. In system 1600', the energy storage elements 1625a to 1625f are connected to ground, rather than the negative terminal of a battery cell. Loads 1611a to 1611c are shown in place of cells 1610a to 1610c, although in some cases one or more of the loads may be battery cells (although not necessarily matched).

In this mode of operation the voltage is regulated by only charging the capacitor to the desired voltage connected to the associated load via a switch, as described herein. This allows for charging and discharging of multiple different battery banks, or driving different loads.

Figure 17:
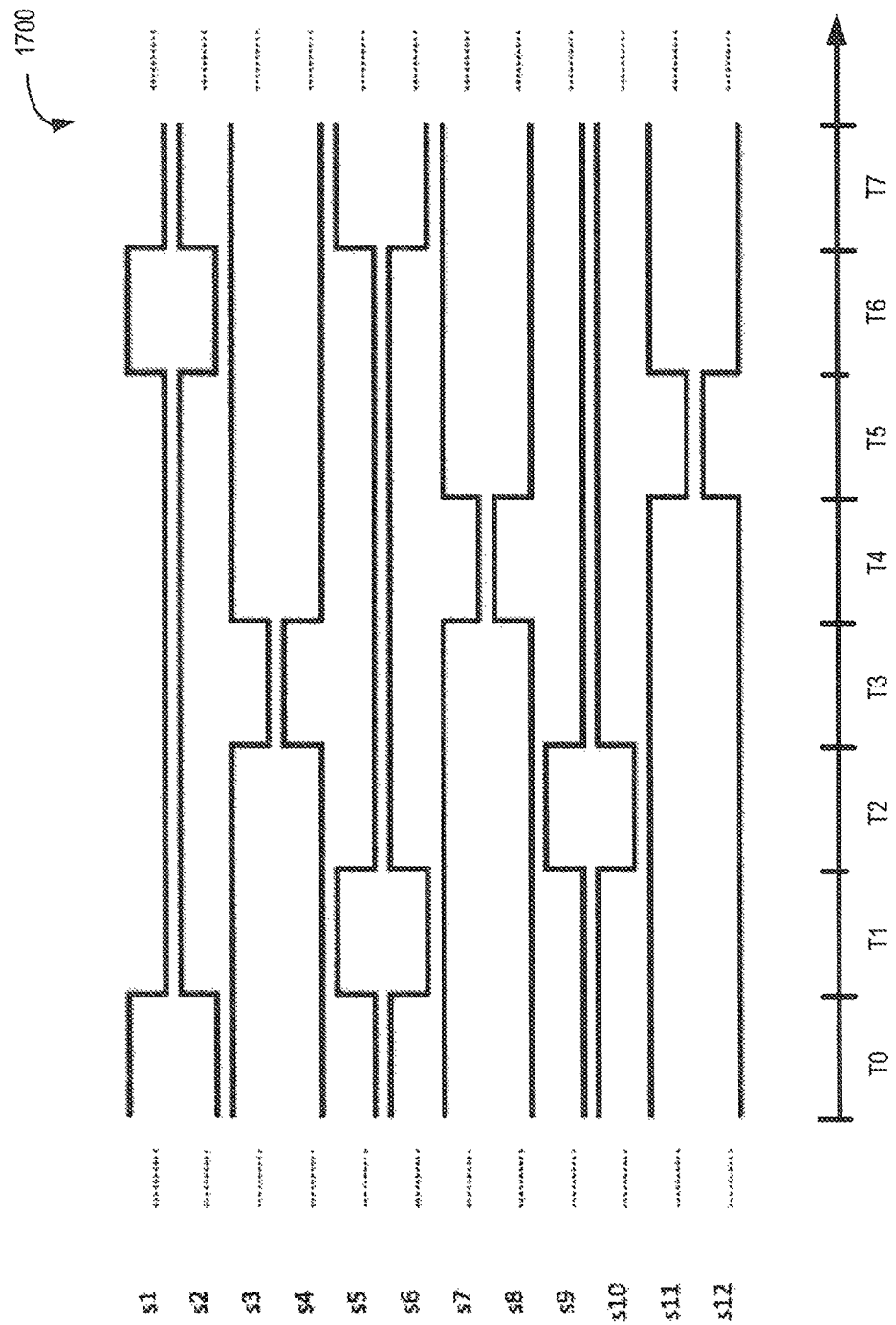
FIG. 17 is an example timing diagram for the system of FIG. 16B.

FIG. 17 illustrates one example timing diagram for continuous charging operation in a multiple load system, such as system 1600' of FIG. 16B. As can be seen in FIG. 17, the charging voltage across the capacitor can be controlled using a pulse width modulated signal, allowing a wide range of power input levels to be used. In the example of FIG. 17, control signals s1 to s12 are illustrated for each of switches S1 to S12 of system 1600'. As illustrated, a 'high' signal causes a switch to be closed, whereas a 'low' signal causes a switch to be open. For example, at time T0, switches S1, S3, S6, S7, S10 and S11 are closed, and switches S2, S4, S5, S8, S9 and S12 are open, allowing energy storage element 1625a to be charged from POWER_IN, while the remaining energy storage elements 1625b to 1625f supply power to their respective loads. At time T1, switches S2, S3, S5, S7, S10 and S11 are closed, and switches S1, S4, S6, S8, S9 and S12 are open, allowing energy storage element 1625c to be charged from POWER_IN, while the remaining energy storage elements 1625a, 1625b and 1625d to 1625f supply power to their respective loads. Various other control schemes (e.g., with inverted control signals) can be employed with similar effect.

In some embodiments, the controller may be configured to allow one or more energy storage element to be coupled to both its respective source (or electrical network) and its respective load simultaneously. This may occur, for example, where the regulated input to a respective energy storage element and the optimal operating point of its respective load are equal, in which case coupling via a energy storage element provides output smoothing. In such cases, the controller may disconnect one or more energy storage element from the respective power source, electrical network or load at different times, taking into account the OOP of each load.

Figure 4:
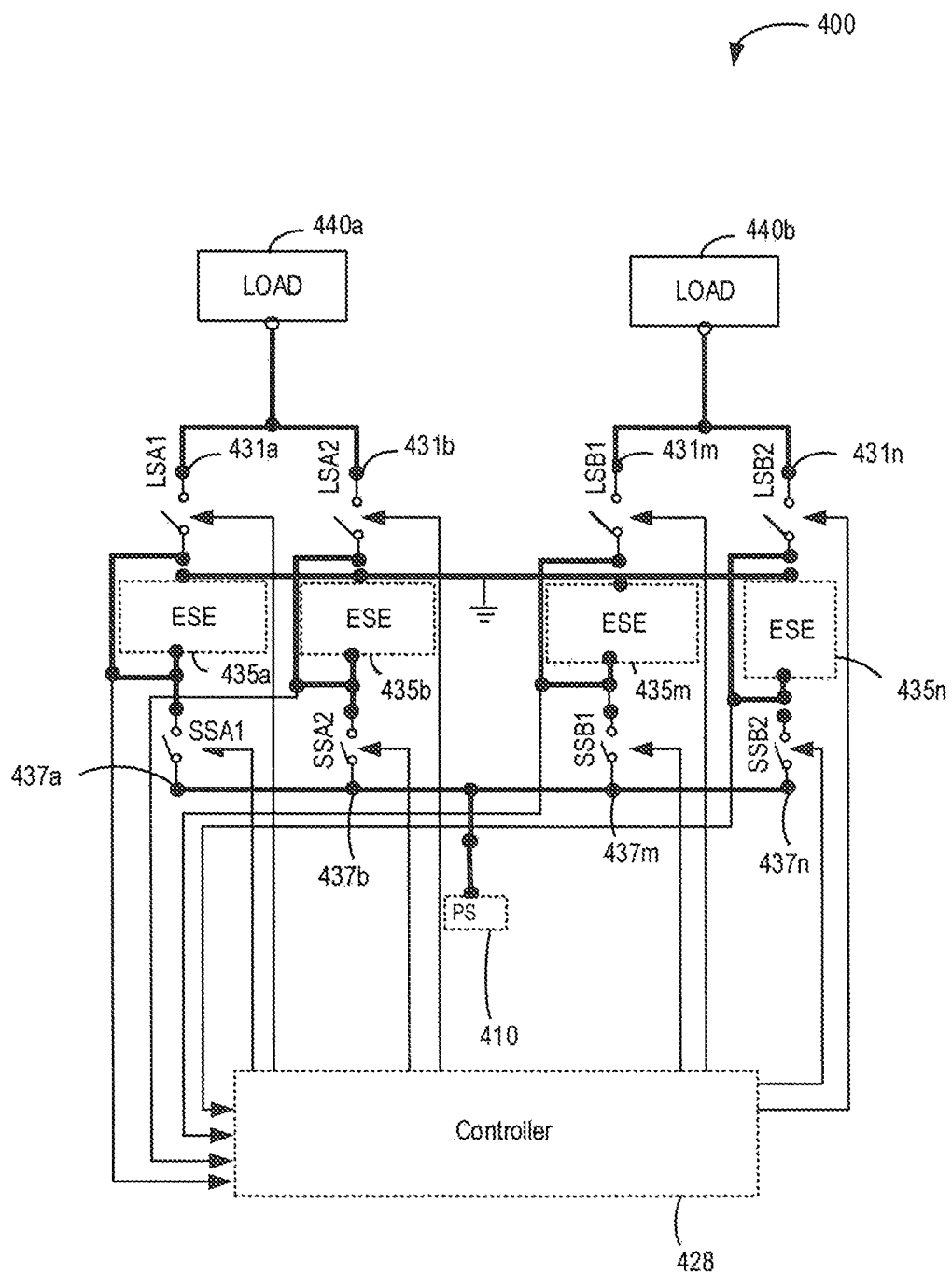
FIG. 4 is another example system for distributing electrical power to a plurality of loads.

Referring now to FIG. 4, there is illustrated yet another example system for distributing electrical power. Power combiner system 400 is analogous to power combiner system 300B of FIG. 3B, with elements having numerals that correspond in all but their most significant digits. In FIG. 4, certain elements are illustrated using circuit diagram symbology to aid understanding. In particular, electrical coupling is indicated using thick lines, and with node connections indicated by circles. Communicative coupling is indicated by thin lines and arrows, and is used to communicate measurements to controller 428 (e.g., from voltage measurement of energy storage elements), and to communicate signals from controller 428 (e.g., to operate source-side or network-side switches).

Power combiner system 400 has loads 440a and 440b, power source 410, load-side switches 431a to 431n, energy storage elements 435a to 435n, network-side switches 437a to 437n and a controller 428. In this configuration, network-side switches may also be referred to as source-side switches, as power is supplied directly from a power source, rather than via an electrical network.

Load 440a is coupled to load-side switches 431a and 431b. Likewise, load 440b is coupled to load-side switches 431m and 431n.

As with system 300A and 300B, load-side switches can be controlled in such a way that couplings between loads 440a and 400b, and respective energy storage elements in a given set are isolated from one another in a form of time division multiplexing. Likewise, network-side switches can be controlled in similar fashion. Outputs from voltage sensors are illustrated as emanating from switches.

In some embodiments, only one selected energy storage element from the plurality of energy storage elements 435a to 435n will be coupled to power source 410 at any given time. Therefore, while the selected energy storage element is connected to power source 410, other energy storage element or elements may be coupled to loads 440a and 440b.

For example, if energy storage element 435b is selected for coupling to power source 410, then network-side switch 437b may be closed, network-side switches 437a, 437m and 437n may be opened, load-side switch 431b may be opened, and load-side switches 431a, 431m and 431n may be closed. In this way, power may be delivered to loads 440a and 440b from multiple energy storage elements simultaneously, while one other energy storage element is charged from the power source.

Figure 8:
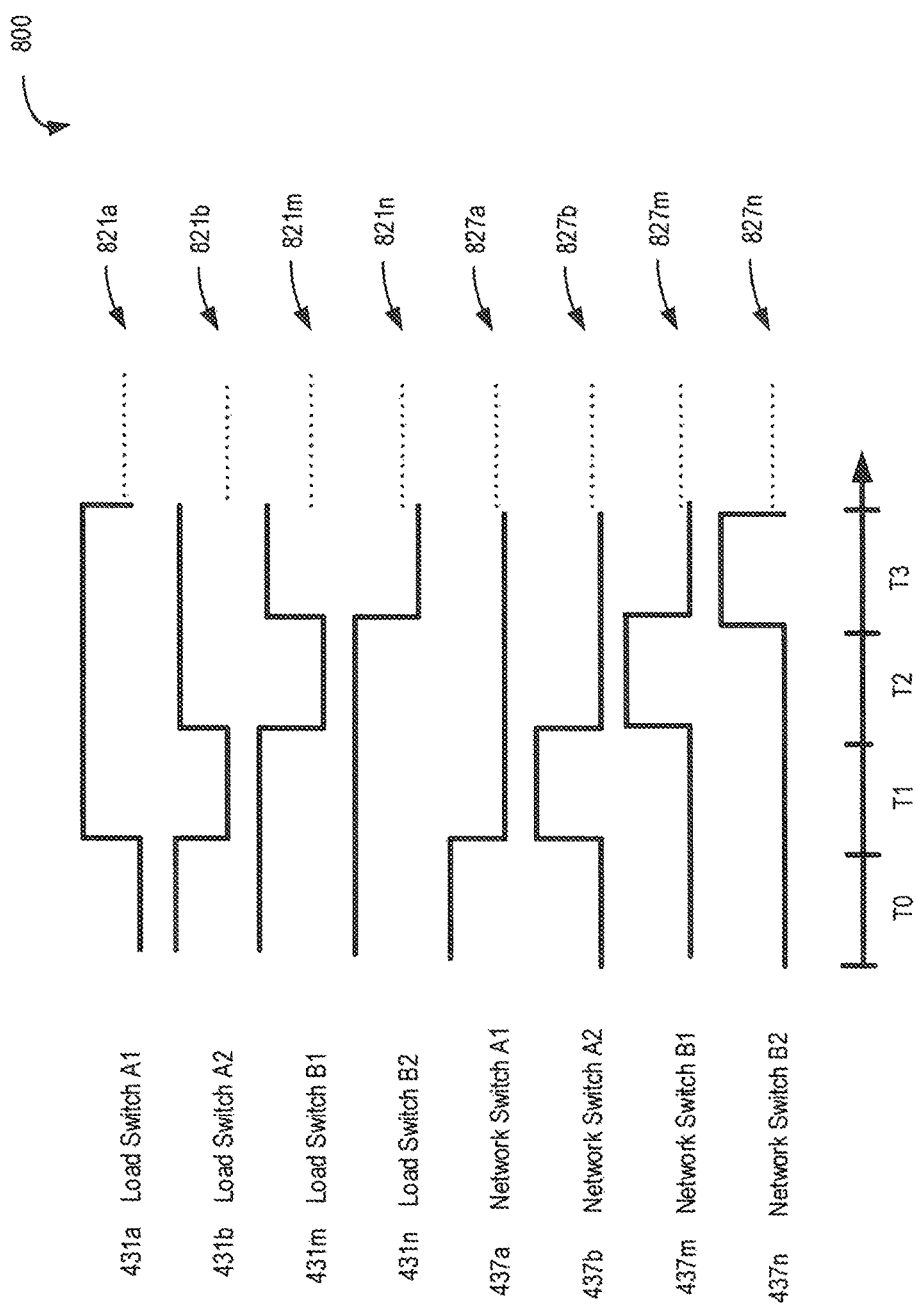
FIG. 8 is a timing diagram for an example switch network from the system of FIG. 4.

Referring now to FIG. 8, there is illustrated an example timing diagram for a sequential progression of switching for power distribution system 400 when operating as a combiner system.

Diagram 800 illustrates eight signal plots 821a, 821b, 821m, 821n, 827a, 827b, 827m and 827n corresponding respectively to each of load-side switches 431a, 431b, 431m and 431n, and network-side switches 437a, 437b, 437m and 437n. In this case, a low signal causes the switch to open or stay opened, a high signal causes the switch to close or stay closed.

It can be observed that in period T1, signal 821b for source-side switch 431b is low, causing the switch to open and decouple the respective power source from the corresponding energy storage element. During period T1, signals 821a, 821m and 821n are high, causing the corresponding source-side switches 431a, 431b and 431n to remain closed and couple to the respective energy storage elements.

Likewise, during period T1, signal 827b for network-side switch 437b is high, causing the switch to close and connect to power source 410. During period T1, signals 827a, 827m and 827n are low, causing the corresponding network-side switches 437a, 437b and 437n to remain open to allow the respective energy storage elements to be coupled to their respective loads.

The switching of the wide range power distribution can be controlled simply by cycling through the load energy storage elements, sequentially as shown in FIG. 8. However, greater efficiency can be achieved through dynamic switching. Dynamic switching involves connecting a storage element that is the furthest below the optimal operating point voltage of its respective load, to the input power (e.g., network 330 in FIG. 3A or power source 310 in FIG. 3B). This can be done by monitoring the voltage of the capacitors and discharging the highest voltage as described herein. Likewise, predictive switching can be used, in which the rise time of energy storage elements can be stored and monitored, for example, in data storage 588 as in FIG. 5. Historical data can be used to predict, during the next period, which storage element is most likely to be at the highest voltage allowing for faster, more efficient selection of energy storage elements.

Referring now to FIG. 5, there is illustrated a schematic block diagram for an example controller in a power combiner system or power distribution system, as described herein.

Controller 528 is analogous to controllers 228, 328 and 428, and is electrically coupled to source module 529, which can include but is not limited to a plurality of source couplings 539a to 539n. Each of the source couplings is connected either to source-side switches or network-side switches, which are arranged in similar fashion to system 400. Source module 529 accordingly electrically couples power sources (not shown) and energy storage elements (not shown) to controller 528 and, via switch network 568, to an electrical network or load as represented by load module 580.

Isolation module 562a couples electrical power input from (or provided to) source module 529 and can isolate power for monitoring by monitor 564 and for use by processor 566. As shown in FIG. 5, isolation module 562a also electrically couples switch network 568a to regulator 570 and, indirectly, to loads 580. However, in some embodiments, switch network 568a may be directly coupled with power inputs, for example, as illustrated in FIGS. 3B, 3C and 4. Likewise, in some embodiments, regulator 570 may be omitted, and switch network 568a may be directly coupled with power outputs, such as loads 580.

Similarly, isolation module 562b couples electrical power output from regulator 570 and switch network 568b to loads 580, in some cases via isolation module 562b. However, in some embodiments, regulator 570 may be omitted, and switch network 568b may be directly coupled with power inputs, such as source module 529, optionally via isolation module 528.

The isolated power sources and loads are coupled to monitor 564, which can measure voltage or power levels and output corresponding data signals to processor 566.

Processor 566 can be a microcontroller or other suitable processor, as described herein, which accepts data signals from monitor 564, computes control signals to be transmitted in accordance using the described methods, and transmits control signals to switch networks 568a and 568b and to bi-directional power regulator 570. Processor 566 may also output data signals to power grid 582 to facilitate grid control and updating, and also to data storage 588 for storage in a database or memory.

Switch network 568a comprises both source-side switches coupled to source module 529 and network-side switches coupled to regulator 570, as described herein. Switch network 568b comprises network-side switches coupled to regulator 570 and load-side switches coupled to loads 580, as described herein. Based on control signals from processor 566, switch networks 568a and 568b configure the appropriate source-side, network-side and load-side switches to couple energy storage elements (not shown in FIG. 5) to the desired power sources or loads.

Regulator 570 can be a power converter, boost converter or other regulator, which accepts power inputs from the current configuration of switches and regulates it to provide a desired voltage or power level. For example, regulator 570 may be a DC-DC converter which converts from one DC voltage to a desired output DC voltage. In some embodiments, more than one regulator 570 may be provided, for example, where there is more than one output load or network with a different desired voltage.

Regulator 570 outputs the converted DC voltage to loads 580 and, in some cases, to sources 529. In the case of DC outputs, such as battery bank 584 or electrical load 586, the regulated output voltage may be supplied directly. In other cases, an inverter 590 may be used to obtain an AC voltage for output to an AC electrical grid 582.

Figure 6:
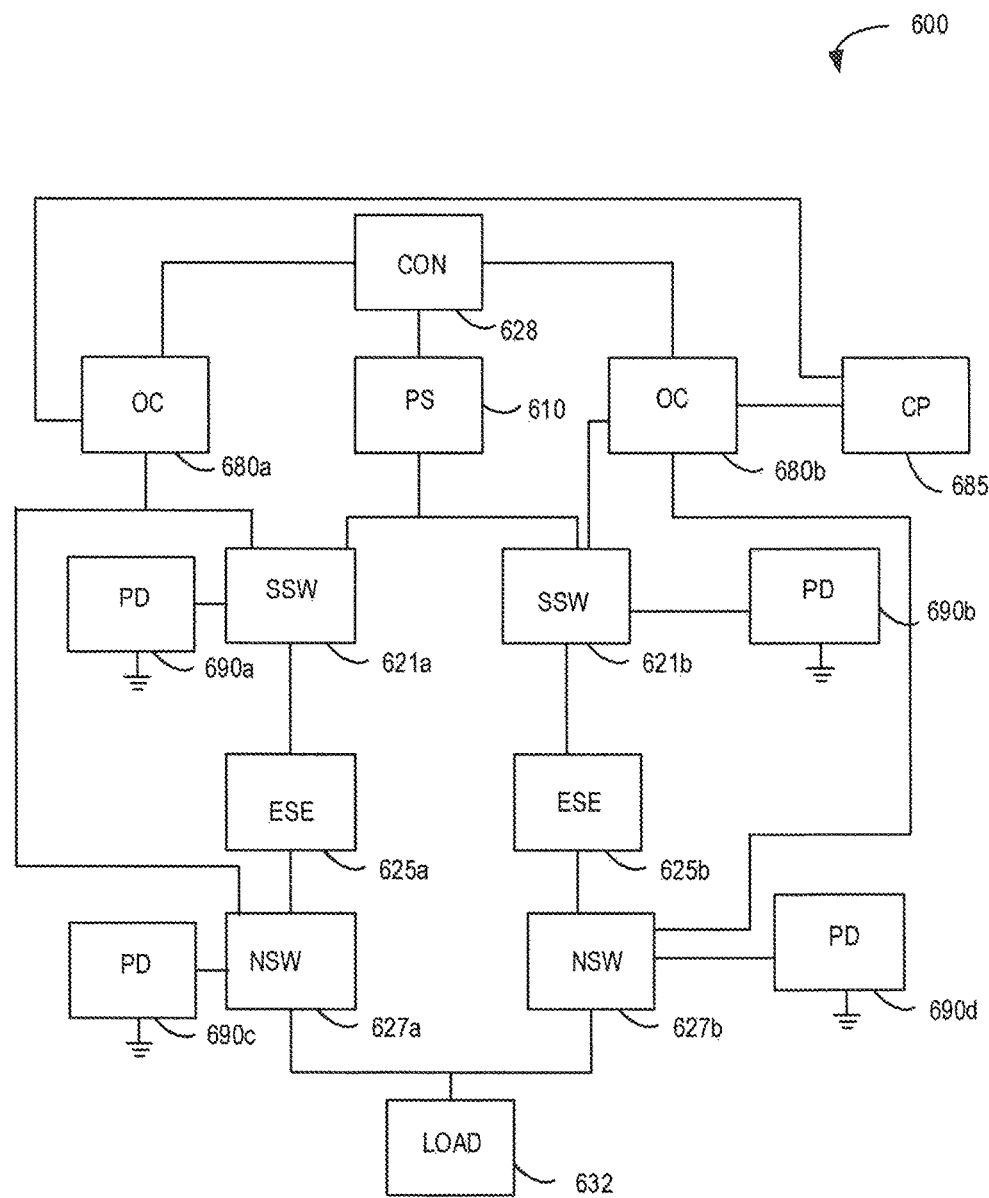
FIG. 6 is an example circuit incorporating an optocoupler for use with the systems of FIG. 3A or 3B, for example.

Referring now to FIG. 6, there is illustrated an circuit incorporating an optocoupler for use with a power combiner or power distribution system. System 600 is a simplified combiner or distribution, analogous to power distribution systems 200, 300A and 400, for example, with elements having numerals that correspond in all but their most significant digits. For ease of understanding, only one each of a power source and load are illustrated, but the circuit of system 600 can be applied with multiple power sources or loads. That is, only one power source and one load are illustrated, however multiple power sources or loads may be present, depending on whether the system is configured as a combiner, distributor or both.

As illustrated, system 600 has a power source 610, source-side switches 621a and 621b, energy storage elements 625a and 625b, network-side switches 627a and 627b, and a controller 628. A load 632 is also connected to each of the network-side switches 627a and 627b. Although shown as a single element, load 632 may also have multiple elements connected in an electrical network, similar to electrical network 330. Accordingly, network-side switches may also be treated as load-side switches in the illustrated embodiment. In some other embodiments, where power source 610 is replaced by an electrical network, source-side switches may be treated as network-side switches while network-side switches may be treated as load-side switches.

In addition to the above elements, system 600 has optocouplers 680a and 680b for driving source-side switches 621a and 621b, respectively. Source-side switches 621a and 621b may be MOSFETs. Optocouplers 680a and 680b are driven by the controller, with a charge pump 685 providing the gate voltage for the high side transistor, as described herein. Further, source-side switches 621a and 621b have pull down circuits 690a and 690b, respectively (e.g., transistors).

Network-side switches 627a and 627b may be configured with pull down circuits 690c and 690d, and/or charge pump power optocouplers, such as optocouplers 680a and 680b. In some cases, separate optocouplers may be provided for network-side switches 627a and 627b.

Figure 15:
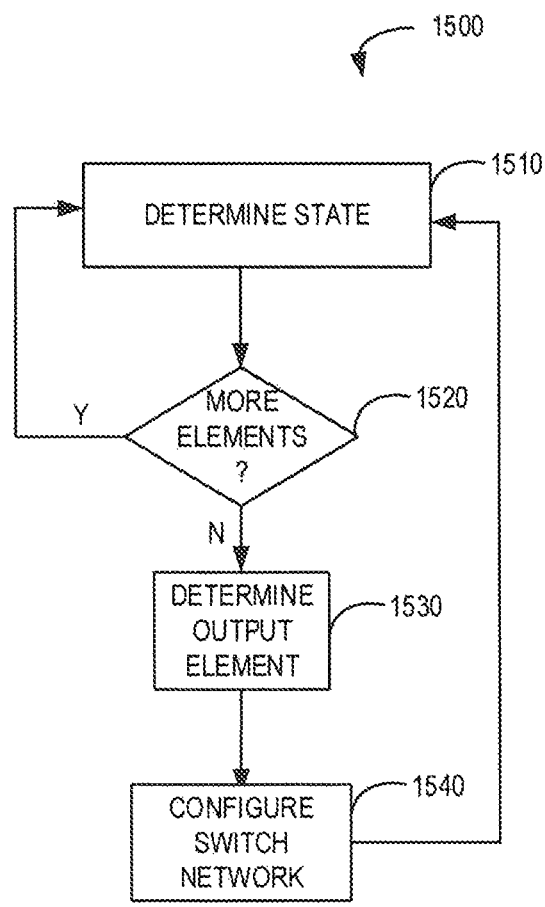
FIG. 15 is a process flow diagram for an example process for combining electrical power from a plurality of power sources.

Referring now to FIG. 15, there is illustrated an example process for configuring the switch network to combine electrical power from a plurality of power sources or to distribute electrical power to a plurality of loads. Process 1500 is one example of a control loop that may be executed by a controller, such as controller 228 of system 200, controller 328 of systems 300A to 300C, or controllers 428, 528 or 628.

Process 1500 begins with the provision of a plurality of energy storage elements arranged in a plurality of sets, each of the plurality of sets corresponding to a respective power source, as described herein.

At 1510, a controller determines a respective state for each selected element of the plurality of energy storage elements. The respective state may be, for example, a node voltage, current or power level. In some cases, the respective state may be a voltage or power level at a node associated with the energy storage elements (e.g., input or output switch). In some cases, the respective state may be a peak voltage, or a peak charging voltage that corresponds to a highest charging rate for the selected element.

At 1520, the controller determines whether there are additional energy storage elements to evaluate and, if yes, determines the state of the additional energy storage elements by returning to 1510.

Otherwise, the controller continues to 1530 to determine, based on the respective state of each of the plurality of energy storage elements, at least one output element from the plurality of energy storage elements. The determination can be made as described herein, for example, with reference to controller 328. For example, the determining may involve measuring a plurality of node voltages corresponding respectively to the plurality of energy storage elements, and determining that a selected node voltage corresponding to the output element is closest to the respective peak charging voltage of the output element. In some embodiments, the determining may involve determining a plurality of energy levels corresponding respectively to the plurality of energy storage elements, wherein the determining is based on the plurality of energy levels. Minimum or maximum voltages or output power levels may also be computed and used in the determination.

Once the determination of the output element (or elements) is made, the controller proceeds to configure the switch network at 1540 to couple the at least one energy storage element element to an electrical network, power source or load. Configuring the switch network can also involve decoupling the output element from its respective power source or load. Likewise, configuring the switch network may involve decoupling a previous output element from the output and recoupling the previous output element to its respective power source or load.

The controller then returns to 1510 to periodically repeat the determining and configuring acts, such as decoupling the output element, decoupling the previous output element, recoupling and coupling to selectively switch between the plurality of energy storage elements.

As noted above, the described methods and systems may be used generally in the context of combining power from several input power sources into one or more outputs, and also in a reverse operation mode in which power can be distributed from a single input into multiple outputs (e.g., power sources). In some embodiments, the reverse operation mode may involve power distribution from multiple inputs to multiple outputs. Such embodiments may be used, for example, to control the charge of a battery pack that contains multiple cells.

In some embodiments, the power distribution system can dynamically change the direction of charge, for example to switch between charging batteries and providing power.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A system for distributing electrical power to a plurality of loads, the system comprising:
    a plurality of capacitors arranged in a plurality of sets, each of the plurality of sets having a common power source;
    a plurality of voltage sensors coupled respectively to each of the plurality of capacitors;
    a plurality of network-side switches corresponding respectively to each of the plurality of capacitors, each network-side switch coupled between a respective capacitor and the power source;
    a plurality of load-side switches corresponding respectively to each of the plurality of capacitors, each load-side switch coupled between a respective capacitor and one of the plurality of loads;
    a controller communicatively coupled to the plurality of voltage sensors and the plurality of network-side switches and the plurality of load-side switches, and configured to:
        determine a respective state for each capacitor of the plurality of capacitors;
        determine an optimal operating point for each respective load corresponding to each capacitor of the plurality of capacitors:
        determine a selected capacitor to be charged from the plurality of capacitors, the selected capacitor having a respective state furthest from a respective optimal operating point for a respective load among the plurality of capacitors;
        direct the plurality of network-side switches and the plurality of load-side switches to couple the selected capacitor to the power source: and
        direct the plurality of network-side switches and the plurality of load-side switches to couple at least one of the plurality of capacitors, other than the selected capacitor, to the plurality of loads.

2. The system of claim 1, wherein the controller is further configured to decouple the selected capacitor from its respective load.

3. The system of claim 1, wherein the controller is further configured to direct at least one of the load-side switches to decouple a previous selected capacitor from the plurality of loads, and to direct at least one of the network-side switches to recouple the previous selected capacitor to its respective power source.

4. The system of claim 3, wherein the controller is further configured to periodically repeat the determining the respective state, the determining the optimal operating point, the determining the selected capacitor to be charged, the decoupling the selected capacitor, the decoupling the previous selected capacitor, the recoupling and the coupling to selectively switch between the plurality of capacitors.

5. The system of claim 4, wherein a period of the periodic repeating is determined based on a discharge time of the plurality of capacitors.

6. The system of claim 4, wherein a period of the periodic repeating is determined based on a charge time of the plurality of capacitors.

7. The system of claim 1, wherein the controller is configured to determine a plurality of energy levels corresponding respectively to the plurality of capacitors, wherein the selecting is based on the plurality of energy levels.

8. The system of claim 7, wherein the controller is configured to enforce a minimum or maximum output power when selecting the selected capacitor.

9. The system of claim, wherein the controller is configured to enforce a minimum or maximum output voltage when selecting the selected capacitor.

10. The system of claim 1, wherein the plurality of network-side switches actuate at a switching frequency of at least 1 kilohertz (kHz).

11. A method of distributing electrical power to a plurality of loads, the method comprising:
    providing a plurality of capacitors arranged in a plurality of sets, each of the plurality of sets having a common power source;
    determining a respective state for each capacitor of the plurality of capacitors;
    determining an optimal operating point for each respective load corresponding to each capacitor of the plurality of capacitors;
    determining a selected capacitor to be charged from the plurality of capacitors, the selected capacitor having a respective state furthest from a respective optimal operating point for a respective power load among the plurality of capacitors;
    coupling the selected capacitor to the power source;
    coupling at least one of the plurality of capacitors, other than the selected capacitor, to the plurality of loads.

12. The method of claim 11, wherein coupling the selected capacitor to the respective load further comprises decoupling the selected capacitor from its respective power source.

13. The method of claim 12, wherein coupling the selected capacitor to the respective load comprises decoupling a previous selected capacitor from its respective load and recoupling the previous selected capacitor to its respective power source.

14. The method of claim 13, further comprising periodically repeating the determining the respective state, the determining the optimal operating point, the determining the selected capacitor to be charge, the decoupling the selected capacitor, the decoupling the previous selected capacitor, the recoupling and the coupling to selectively switch between the plurality of capacitors.

15. The method of claim 11, wherein the determining further comprises determining a plurality of energy levels corresponding respectively to the plurality of capacitors, wherein the determining is based on the plurality of energy levels.

16. The method of claim 15, wherein the determining further comprises enforcing a minimum or maximum output power.

17. The method of claim 15, wherein a period of the periodic repeating is determined based on a discharge time of the plurality of capacitors.

18. The method of claim 15, wherein a period of the periodic repeating is determined based on a charge time of the plurality of capacitors.

19. the method of claim 11, wherein the determining further comprises enforcing a minimum or maximum output voltage.

20. The method of claim 11, further comprising:
providing a plurality of network-side switches corresponding respectively to each of the plurality of capacitors;
wherein coupling the selected capacitor to the power source comprises directing at least one of the plurality of network-side switches to couple the selected capacitor to the power source: and
the plurality of network-side switches actuate at a switching frequency of at least 1 kilohertz (kHz).

21. A non-transitory computer-readable medium storing computer usable instructions for execution by a processor, the instructions when executed by the processor for causing the processor to carry out a method of distributing electrical power to a plurality of loads, the method comprising:
providing a plurality of capacitors arranged in a plurality of sets, each of the plurality of sets having a common power source;
determining a respective state for each capacitor of the plurality of capacitors;
determining an optimal operating point for each respective load corresponding to each capacitor of the plurality of capacitors;
determining a selected capacitor to be charged from the plurality of capacitors, the selected capacitor having a respective state furthest from a respective optimal operating point for a respective power load among the plurality of capacitors;
coupling the selected capacitor to the power source; and
coupling at least one of the plurality of capacitors, other than the selected capacitor, to the plurality of loads.

22. The non-transitory computer-readable medium of claim 21, wherein the method further comprises:
providing a plurality of network-side switches correspondingly respectively to each of the plurality of capacitors;
wherein coupling the selected capacitor to the power source comprises directing at least one of the plurality of network-side switches to couple the selected capacitor to the power source; and
the plurality of network-side switches actuate at a switching frequency of at least 1 kilohertz (kHz).

* * * * *